US007280920B1

(12) United States Patent
Whiteside et al.

(10) Patent No.: US 7,280,920 B1
(45) Date of Patent: Oct. 9, 2007

(54) METHOD AND APPARATUS FOR FORECASTING EARTHQUAKES AND MAKING INFORMED RISK MANAGEMENT DECISIONS

(76) Inventors: Lowell S. Whiteside, 53 Hawthorne Ct., Cumberland, ME (US) 04021; Michael J. Kozuch, 6183 Corte Podge, Pleasanton, CA (US) 94566

( * ) Notice: Subject to any disclaimer, the term of this patent is extended or adjusted under 35 U.S.C. 154(b) by 84 days.

(21) Appl. No.: 11/170,126

(22) Filed: Jun. 29, 2005

(51) Int. Cl.
*G01V 11/00* (2006.01)
*G01V 1/00* (2006.01)

(52) U.S. Cl. ....................................................... 702/15
(58) Field of Classification Search ................... 702/15
See application file for complete search history.

(56) References Cited

U.S. PATENT DOCUMENTS

| | | | |
|---|---|---|---|
| 4,961,143 A * | 10/1990 | Takahashi et al. ............. 702/15 |
| 5,086,415 A * | 2/1992 | Takahashi et al. ........... 367/125 |
| 5,130,712 A * | 7/1992 | Rubin et al. ............... 342/26 D |
| 5,148,110 A * | 9/1992 | Helms .......................... 324/323 |
| 5,521,508 A * | 5/1996 | Merzer ........................ 324/345 |
| 5,694,129 A * | 12/1997 | Fujinawa et al. .............. 342/22 |
| 6,038,512 A * | 3/2000 | Williams ......................... 702/3 |
| 6,859,416 B2 * | 2/2005 | Inubushi ....................... 367/14 |
| 6,870,482 B2 * | 3/2005 | Cherry ........................ 340/690 |
| 6,985,817 B2 * | 1/2006 | Saenz Alvarado ........... 702/15 |
| 7,035,765 B2 * | 4/2006 | Tanahashi .................... 702/183 |
| 2004/0012491 A1 * | 1/2004 | Kulesz et al. ................ 340/506 |
| 2004/0181376 A1 * | 9/2004 | Fables et al. ................... 703/6 |
| 2006/0229813 A1 * | 10/2006 | Tobiska .......................... 702/2 |

* cited by examiner

*Primary Examiner*—Donald E McElheny, Jr.

(57) ABSTRACT

A data-driven method and system to forecast earthquakes worldwide over a broad range of time (from days to years in advance). The system includes the compilation of a diverse set of historical geophysical and environmental databases, a program that determines correlations between earthquake occurrence and the state of other geophysical or environmental phenomenon, and a program to forecast earthquakes. The forecasts allow users to make informed risk management decisions.

43 Claims, 26 Drawing Sheets

General Flow of Forecasting Methodology

DIAGRAM OF CORRELATOR PROGRAMS

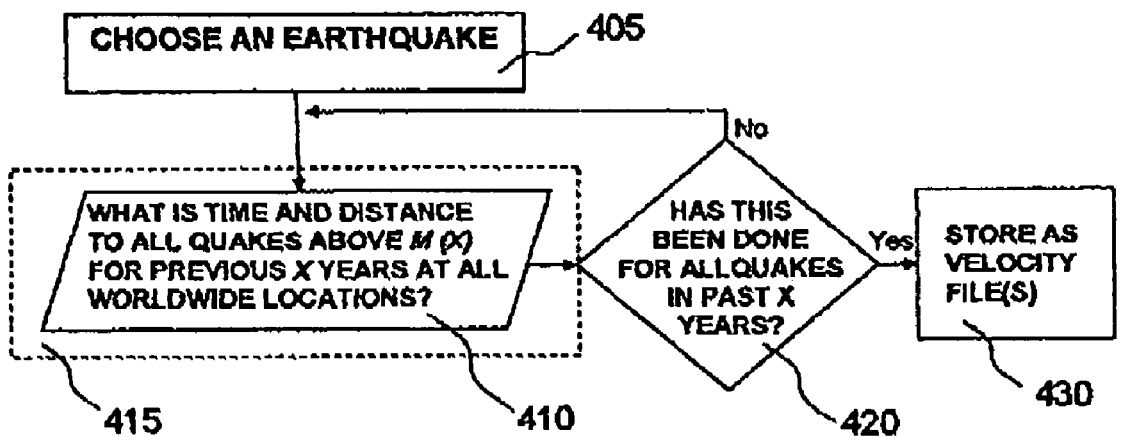

DIAGRAM OF CORRELATOR PROGRAMS TIDAL SUBSET

INDEX TO FIRST LINE OF DATA (e.g. last bold line):
Latitude=5.8
Longitude=-82.6
Number of wavefronts=9
Date= 5/4/2005
INDEX TO SECOND (AND SUBSEQUENT) LINE(S) OF DATA:
Velocity= 0.051928
Distance in degrees= 104
Date of original earthquake=11-12-1999
Date of forecast=05- 4-2005
Azimuth (angle in degrees) from original quake to forecast= 290
Azimuth (angle in degrees) from forecast site to original quake= 46
Latitude of original earthquake=40.8
Longitude of original earthquake=31.2
Depth of original earthquake (in kms)=10
Magnitude of original earthquake=7.5

Fig. 13

```
NO. HEMISPHERE
    1.1  -90.6 40  5  6 2005   3.5-4.5  Galapagos Islands    1 2 23766 492
    3.0  -77.8 45  5  3 2005   4.0-5.0  Colombia             1 2 23719 497
    4.6  -72.5 45  5  2 2005   4.0-5.0  Colombia             1 2 23720 497
OR
    6.9  -73.1 50  5  3 2005   4.0-5.0  Colombia             2 2 23720 497
    5.8  -82.6 50  5  3 2005   3.5-4.5  Costa Rica           1 2 23721 493
OR
    6.5  -82.5 40  5  4 2005   3.5-4.5  Costa Rica           2 2 23721 493
    9.0  -83.3 40  5  3 2005   3.5-4.5  Costa Rica           2 2 23645 493
   13.0  -93.0 40  5  8 2005   3.0-5.5  Chiapas, Mexico      1 2 23790 465
OR
   15.5  -92.1 45  5  8 2005   3.0-4.5  Chiapas, Mexico      2 2 23790 465
   14.2  -91.9 35  5  3 2005   3.5-5.5  Guatemala            2 2 23674 466
OR
   14.2  -91.7 35  5  5 2005   3.5-5.5  Guatemala            3 2 23674 466
```

DIAGRAM OF FORECASTING PROGRAMS – NONSEISMIC TRIGGERS

Fig. 15

```
GLOBAL EVENTS:

Following is a listing of epicenters (depth<100 km) where a Mb>=4.0
earthquake is considered possible between 04 May, 2005 and 10 May, 2005.
Day of occurrence is +/- 4 days of day given, epicenter is expected to
be correct within 95 km latitude and longitude.

MOST LIKELY
                            DATE
EPICENTER         # MO DA YEAR  MAG RANGE   LIKELY LOCATION        ID NUMBER
N LAT W LONG EST
             PROB.

NO. HEMISPHERE 1.1   -90.6 40   5  6 2005   3.5-4.6   Galapagos Islands      1 2 23766 492
    3.0   -77.8 40   5 10 2005   3.5-5.0   Colombia               1 2 23808 497
OR
    6.9   -73.0 50   5 10 2005   3.5-5.0   Colombia               2 2 23808 497
    6.5   -82.5 40   5  4 2005   3.5-4.5   Costa Rica             2 2 23721 493
   13.0   -93.0 40   5  8 2005   3.0-5.5   Chiapas, Mexico        1 2 23790 465
OR
   15.5   -92.1 45   5  8 2005   3.0-4.5   Chiapas, Mexico        2 2 23790 465
   14.2   -91.7 35   5  5 2005   3.5-5.5   Guatemala              3 2 23674 466
   14.5   -92.2 50   5  5 2005   3.0-4.5   Chiapas, Mexico        3 2 23647 465
   18.2   -61.4 40   5  7 2005   3.0-4.8   Leeward Islands        1 2 23767 475
```

Fig. 16A

Seismic Watch Creation
1600

The Seismic Watch module is designed to allow the forecasting team to modify 'EXISTING' forecasts that have already been uploaded into the CoreWeb database.

To Create:
- Enter a geographic 'BOX' set off by minimum and maximum latitude and longitude markers (see four input fields below). This area does NOT need to correspond to any particular existing display map on the web application.
- Enter a date range (GMT) indicating when this seismic watch is in effect
- Enter desired change in magnitude
- CoreWeb establishes a subset of existing forecasts that are affected by this seismic watch.
- The web application will create a 'NEW' forecast record for each existing forecast affected which will supercede the original forecast (because it will have a more recent date/time stamp)

To Edit: Click on the SWID number. Once a seismic watch is processed its basic parameters cannot be edited, only its description. Please carefully ensure the integrity of the parameters before moving to processing step.

To Process: Click on Status Value which will take you to a special page to view forecasts affected and begin processing a seismic watch

To Delete/Deactivate: Contact CoreWeb.

| SWID | minlat | maxlat | minlong | maxlong | Start date | End date | mag_mod | status | Date stamp |
|------|--------|--------|---------|---------|------------|----------|---------|--------|------------|
| 2549 | -90 | 90 | -180 | 180 | 4/30/2005 | 5/6/2005 | 0.5 | processed | 4/29/2005 6:18.10 PM |
| 2548 | 0 | 80 | -180 | -15 | 4/26/2005 | 4/30/2005 | 0.5 | processed | 4/23/2005 4:27:10 PM |
| 2547 | 0 | 70 | -180 | -15 | 4/21/2005 | 4/25/2005 | 0.4 | processed | 4/21/2005 3:19:33 PM |

Seismic Watch Processing

The Seismic Watch displayed below is pending activation. Please review all data carefully. If any information below is in error, it is not too late to edit the seismic watch before activation (see edit option in upper left hand corner of gray box below). The forecasts affected by this seismic watch are listed in a separate table at the bottom of this page (please scroll and down and review carefully). If all the data is satisfactory, then please click on ACTIVATE option in lower right hand corner of gray box:

Seismic Watch ID=2549
Processed

Created 4/29/2005
6:15:10 PM — 1685

1650 maximum latitude
90 degrees

Minimum Longitude
-180 degrees

GEOGRAPHIC AREA AFFECTED
Start Date: 4/30/2005
End Date: 5/6/2005

Maximum Longitude
180 degrees

1680 minimum latitude
-90 degrees

1660

Magnitude Delta: 0.5

1670 — Description: Moderate global seismic watch. Most likely areas to see an event of M>=6 are within 20 degrees of the equator or at latitudes higher than 45 north or south latitude. Expected probability of an event of M=6 during the watch period is 65%.

There are 160 earthquake forecast records below. These records were created by the criteria established in the Seismic Watch ID = 2549 AND are now live on the geoForecaster.com web site.

| ID | subID | Probability | Date | Mag. Range | Latitude | Longitude | Location |
|---|---|---|---|---|---|---|---|
| 23720 | 1 | 45 | 5/2/2005 | 4-5.5 | 4.6 | -72.5 | Colombia |
|  | 2 | 60 | 5/3/2005 | 4-5 | 6.9 | -73.1 | Colombia |
| 23721 | 1 | 50 | 6/3/2005 | 3.5-5 | 8.6 | -82.6 | C.R./Panama |
|  | 2 | 40 | 9/4/2005 | 3.5-4.9 | 8.5 | -82.5 | C.R./Panama |
| 23722 | 1 | 35 | 5/3/2005 | 3-4.9 | 34.2 | 26.2 | Crete |
| 23723 | 1 | 35 | 5/3/2005 | 4-5.7 | 36.7 | 141.7 | Off East Coast Honshu |

Potential Probabilities for a given magnitude (Actual vs Forecast)

SOUTHERN CALIFORNIA FORECAST MAGNITUDE ≥2 COMPARISON (MARCH 18-22, 2002)

| Event ID | Probability | Date | Magnitude | Lat. | Long. | Location |
|---|---|---|---|---|---|---|
| 23721-1 | 50 | 5/3/05 | 3.5-5 | 5.8 | -82.8 | Costa Rica-Panama |
| 23721-2 | 40 | 5/4/05 | 3.5-5 | 6.5 | -82.5 | Costa Rica-Panama |

METHOD AND APPARATUS FOR FORECASTING EARTHQUAKES AND MAKING INFORMED RISK MANAGEMENT DECISIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to the field of predicting events, and particularly risks such as earthquakes. The invention is more particularly related to a comprehensive statistical analysis of past and current trigger factors and other conditions that allow an accurate prediction of an event.

2. Discussion of Background

The capacity to respond to the world's natural disasters is becoming increasingly more difficult, both in terms of insurance and mitigation, and many countries will be on their own to respond to these events. While many governments are struggling to identify their hazards and implement long-term strategies to prepare for them, there is a tremendous need for short-term forecasting to minimize casualties and losses.

Economic losses in the nineties amounted to over $535 billion ($99 billion insured) while in the fifties losses were roughly $38 billion (with less than $5 billion insured). The change over this period is an increase in losses by a factor of 14.

Individual earthquakes may also have extreme repercussions on national economies and in some cases contribute to a significant drop in national GDP, such as with Algeria or Armenia.

Underwriting losses parallel the frequency and severity of property catastrophes and overall the industry is writing business at an underwriting loss. Operating margins remain weak for a number of companies resulting from not only substantial losses due to catastrophes, but also from the price wars sustained in the early 90's.

The increased losses to natural disasters are largely due to the increased migration of people into great population centers. Of 100 of the largest cities of the world, with populations exceeding 2 million, over 40 lie within 200 km of a plate boundary. Many of these cities are classified by the United Nations as mega-cities with populations over 8 million, and further growth is aggravating the urban long-term seismic risk. The problem is particularly acute for those cities that are also capital cities, drawing significant proportions of their population into a single urban center such as Mexico City (24%), Santo Domingo (35%), Athens (37%), Tel Aviv (42%), Lima (31%), Santiago (36%), Wellington, New Zealand (13%) and many others.

Earthquake activity has typically been modeled as a random or Poisson process. Most earthquake activity appears to follow the well known Gutenburg-Richter magnitude frequency relationship, $\log(N)=a-bM$, where N is the number of earthquakes, a is a constant that specifies the level of seismic activity, b is a constant that indicates the rate of activity and M is the magnitude.

The traditional and current status of earthquake forecasting lies in modeling the rate of earthquake activity on a particular fault or region to come up with long term probabilities of activity. Results are non-specific and often stated as "there is a 20% chance of a magnitude 7 earthquake in 50 years".

This modeling of probability of earthquake occurrence involves determining the average activity on known faults, incorporating the activity on unknown nearby faults and calculating the probability of future activity using time-independent Poissonian probabilities as well as time-dependent probabilities as faults progress through the "earthquake cycle".

In terms of actual forecasting, the widely used approach to short term earthquake forecasts is limited to aftershocks. Once a large mainshock earthquake occurs, statements about the expected aftershocks are limited to an area near or surrounding the fault and the size of the potential aftershocks.

Although most seismologists and engineers model earthquake activity as a random process, it is also well known that earthquakes may either cluster in time or may be induced through human or natural intervention, neither of which follows a random process.

Examples of clustering include earthquake swarms, multiple large events spaced closely in time and aftershock series.

Examples of induced seismicity include earthquakes associated with the filling or emptying of reservoirs, or the injection of fluids at depth such as in Colorado in the early sixties. Triggering by natural solid earth phenomena includes distant earthquakes as triggering sources and earth tides.

Numerous other factors correlate with earthquake activity, including seismicity related to weather related phenomena such as El Niño, oceans storms (e.g. sea waves beating on the shore), vertical loading of the earth's crust by the atmosphere, and horizontal loading of the earth's crust by the atmosphere.

Finally, there are strong correlations between earthquake activity and the occurrence of space weather phenomena. Seismicity rates have been linked to solar flares and its byproducts as well as solar periodicities. Several theories can be found in published scientific literature to explain the seemingly unusual links between earthquakes and space phenomena.

However, traditional earthquake predictions are inadequate because of inaccuracies, inconsistencies, or insufficient lead time to allow for appropriate evacuations or other preparations that may be desired. With the increasing shift to population centers subject to earthquakes, the cost, problems, and opportunities to mitigate risks associated with earthquakes are expected to rise well into the future.

SUMMARY OF THE INVENTION

The present inventors have invented a new technique that correlates and statistically analyzes a variety of data, trigger factors, history, and other conditions to allow meaningful and accurate prediction of manageable risks, including the risk of significant seismic activity. The present invention includes the design of an integrated system of components that provide a new approach and methodology to forecast earthquakes.

The present invention includes various methods to utilize risk prediction to effectively mitigate the predicted risk, including emergency management and proactive disaster preparedness. The present invention also includes the application of risk prediction to increase profitability in underwriting by insurance carriers and effective management of any type of financial instrument that might be directly or indirectly affected by predicted events.

In one embodiment, the present invention provides a forecasting process that integrates diverse data sets in conjunction with historical patterns and to estimate a future state. The general characteristics of the earth related to seismic activity are assumed to be in a metastable state that only requires a small additional load on a region to trigger an earthquake. Although the present invention focuses on earthquakes, from a broader perspective, the occurrence of any event or risk can be modeled using similar processes so long as sufficient diverse datasets related to the event or risk are available.

The present invention is embodied as a computational system that provides an earthquake forecasting service and consists of, a database of a diverse range of data files containing data related to past earthquakes, an earthquake forecasting module configured to compute a probability and magnitude of an earthquake occurring at the location of interest based on the diverse range of data files, and a report generator configured to provide reports in the form of maps and tables that show the time and location of probable earthquakes.

The present invention includes a method of building a statistical base for earthquake forecasting, comprising the steps of, collecting data from diverse data sources, correlating the collected data relative to each earthquake in a database of previous earthquakes, and forecasting future earthquake events based on the correlated data.

The present invention also includes a forecasting method, comprising the steps of, calculating first velocity relationships between each major event and every other major event in a database of events, choosing an evaluation point, calculating second time/distance velocity relationships between the evaluation point and all major events in the catalog for a predetermined previous time frame, and forecasting an event at the evaluation point if more than a predetermined number of the second velocities exceed a threshold velocity.

Portions of both the system and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A is a flow diagram of an Earthquake (seismological) correlator program according to an embodiment of the present invention;

FIG. 12 is an example screenshot illustrating initial data for wavefront velocities according to an embodiment of the present invention;

FIG. 13 is an example screenshot illustrating a portion of a forecast file indicating locations having multiple wavefronts according to an embodiment of the present invention;

FIG. 15 is a screenshot of a forecaster output according to an embodiment of the present invention;

FIG. 16A is an example web interface for updating a forecast according to an embodiment of the present invention;

FIG. 16B is an example web display for seismic watch verification according to an embodiment of the present invention;

DESCRIPTION OF THE PREFERRED EMBODIMENTS

Figure 1:
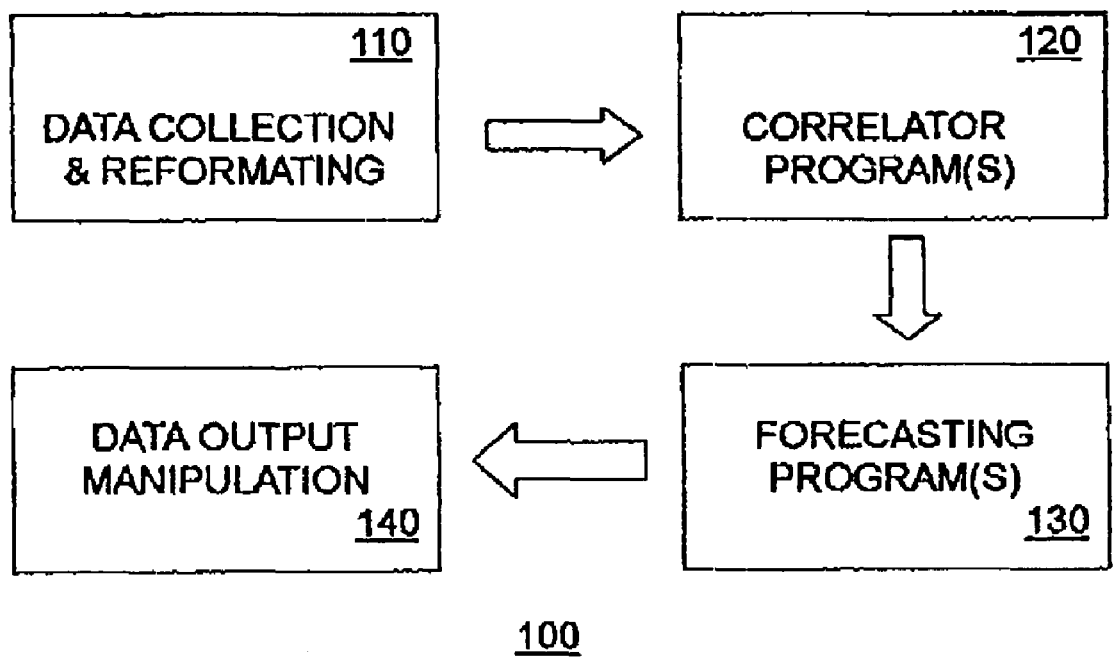
FIG. 1 is a high level flowchart of an earthquake forecasting system according to an embodiment of the present invention.

Referring now to the drawings, wherein like reference numerals designate identical or corresponding parts, and more particularly to FIG. 1 thereof, there is illustrated an overview of a forecasting process 100 which includes the collection of diverse datasets 110, a series of pattern recognition computations (Correlator Program(s) 120), a series of forecasting procedures and computations (Forecasting Programs 130), and finally the manipulation of the output into user-defined tables and maps (Data Output Manipulation 140).

While the determination of the potential for future earthquakes is established using statistical pattern recognition techniques, there is also a physical basis for changes in the potential for earthquake activity. In any part of the Earth that is in a metastable state, the passage of a seismic wave or presence of any other trigger acts to increase the load on that point thereby causing an earthquake or bringing that point closer to rupture. Should multiple wavefronts or triggers intersect at the same location and point in time, then the probability of an event is increased significantly.

The collection of diverse datasets results in an integrated data set with a historical perspective from which to estimate a future state. Since most of the earth is assumed to be in a seismically metastable state, the trigger factors then take precedence and their appearance triggers the earthquake. Therefore, each of the triggering factors constitute the data sets that are gathered and formatted such that correlations may be determined between the diverse data sets and past earthquakes which are then extrapolated in time and causation to forecasted events.

Figure 2:
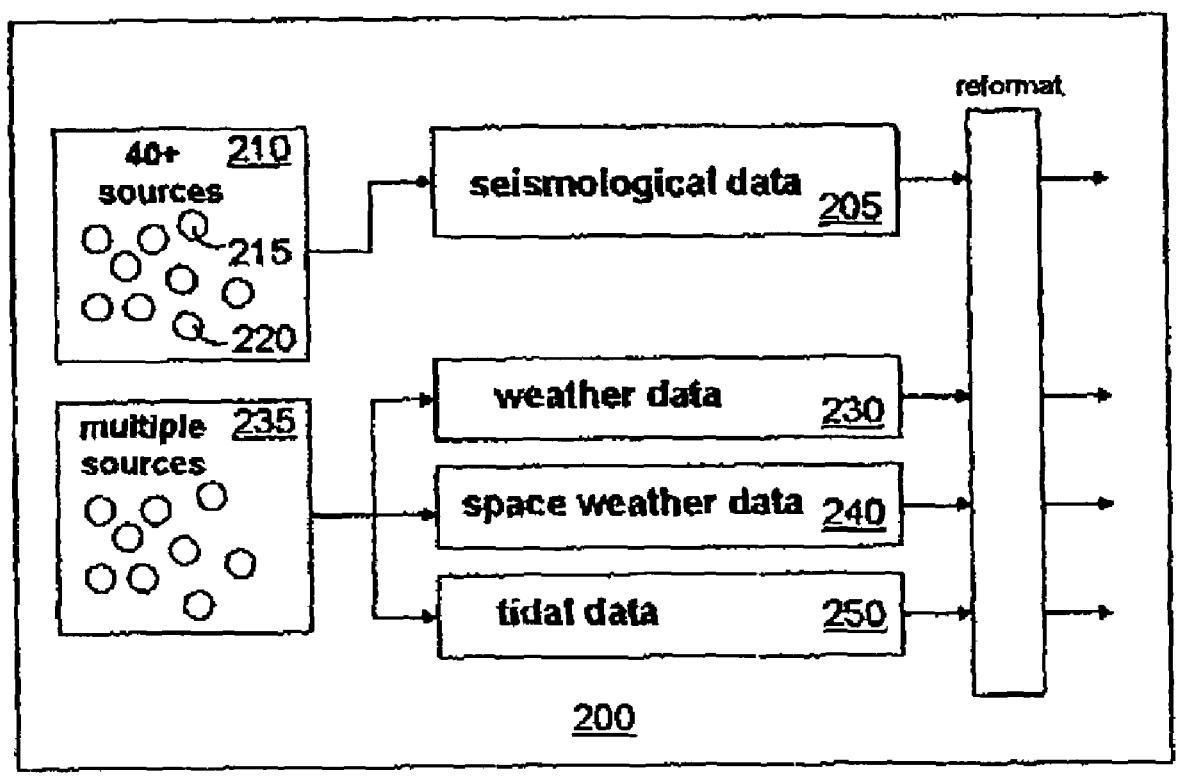
FIG. 2 is a flow diagram of a compilation and integration of diverse geophysical and environmental data sets from multiple sources according to an embodiment of the present invention.

FIG. 2 illustrates an example process 200 for the compilation and integration of the diverse data sets. Seismological data 205 is collected, for example, from public domain literature, websites, and reports 210. At least 40 highly relevant datasources are available worldwide. For example, the United States Geologic Survey (USGS), illustrated as source 215, at http://www.usgs.gov, provides data such as that found in Table 1. Table 1 is sample data acquired from USGS, and comprises a listing of time, date, location (latitude, longitude, depth), and magnitude (MAG) of seismic events.

TABLE 1

| MAG | DATE y/m/d | UTC- h:m:s | LAT deg | LON deg | DEPTH km | REGION |
|---|---|---|---|---|---|---|
| 5.6 | 2005/04/06 | 11:20:10 | −3.954 | 102.355 | 76.8 | SOUTHERN SUMATRA, INDONESIA |
| 5.2 | 2005/04/06 | 08:44:57 | 41.408 | 78.676 | 21.6 | SOUTHERN XINJIANG, CHINA |
| 5.1 | 2005/04/06 | 00:28:06 | −56.164 | 146.331 | 10.0 | WEST OF MACQUARIE ISLAND |
| 5.0 | 2005/04/05 | 19:58:42 | −54.068 | 7.038 | 10.0 | BOUVET ISLAND REGION |
| 5.2 | 2005/04/05 | 09:37:23 | 1.906 | 96.951 | 25.3 | NIAS REGION, INDONESIA |
| 5.1 | 2005/04/04 | 21:00:46 | 1.893 | 97.742 | 30.0 | NIAS REGION, INDONESIA |
| 5.3 | 2005/04/04 | 19:37:11 | 4.811 | 94.783 | 51.3 | OFF THE WEST COAST OF NORTHERN SUMATRA |
| 5.2 | 2005/04/04 | 08:16:23 | −20.495 | −178.370 | 545.7 | FIJI REGION |

Duplicate events from the various sources are removed. For example, a second seismological data source 220 may also provide information on Indonesian earthquakes. A hierarchy of preferences within the data collection program 110 removes potential duplicate earthquake listings from the database. Data from a preferred datasource in the hierarchy is maintained, and data from a same event in a different, and less preferred, source is discarded (e.g., either removes source 220's info or USGS 215 info, depending on preference). A final review may be done by the forecaster to verify that there are no duplicates. To assist in final review, the data source are displayed or printed in tabular form and sorted based on column headings such as region, time, etc., according to the forecaster's taste. In one embodiment, a matching algorithm that matches events based on magnitude, and/or time of the event (e.g., events within a predetermined amount of time and/or distance) may also be utilized to help identify (e.g., highlight) potential duplicate events. A preferred source is one basis for the hierarchy, another is that, generally speaking, local catalogs take precedence over international data gathering agencies. When a potential earthquake lies beyond the local network, then the international agency listings take priority. In one embodiment, listings from two sources may be combined, for example, when a preferred source is missing information it can be supplemented from a secondary source without discarding the preferred source data that is available.

Weather data 230 may be collected or purchased from any one of many reliable sources 235 (e.g., see Tables 2 and 3). Information on wind speed, direction, pressure, temperature, and hurricane ratings (if any) are gathered. Generally the "centroid" of a weather system is recorded, such as the geographic center of a hurricane or a tropical depression. For example, Table 2 provides a listing of storm data for storm Lili which is number 12 of the year 2002.

TABLE 2

| Mo. | Day | Hour | Lat. | Long. | Dir. | Speed of Storm | Wind Speed | Pressure | Type |
|---|---|---|---|---|---|---|---|---|---|
| Sep | 30 | 0 UTC | 19.0 N | 78.1 W | 300 deg | 5 mph 9 kph | 65 mph 100 kph | 993 mb | Tropical Storm |
| Sep | 30 | 6 UTC | 19.1 N | 78.7 W | 280 deg | 5 mph 9 kph | 70 mph 110 kph | 990 mb | Tropical Storm |
| Sep | 30 | 12 UTC | 19.6 N | 79.6 W | 300 deg | 10 mph 16 kph | 75 mph 120 kph | 986 mb | Hurricane - Cat. 1 |
| Sep | 30 | 18 UTC | 20.0 N | 80.3 W | 300 deg | 8 mph 12 kph | 75 mph 120 kph | 984 mb | Hurricane - Cat. 1 |
| Oct | 1 | 0 UTC | 20.5 N | 81.1 W | 305 deg | 10 mph 16 kph | 80 mph 130 kph | 978 mb | Hurricane - Cat. 1 |
| Oct | 1 | 6 UTC | 21.0 N | 82.2 W | 95 deg | 12 mph 20 kph | 85 mph 140 kph | 970 mb | Hurricane - Cat. 1 |
| Oct | 1 | 12 UTC | 21.6 N | 83.2 W | 305 deg | 12 mph 20 kph | 105 mph 165 kph | 971 mb | Hurricane - Cat. 2 |
| Oct | 1 | 18 UTC | 22.4 N | 84.4 W | 305 deg | 14 mph 24 kph | 105 mph 165 kph | 971 mb | Hurricane - Cat. 2 |
| Oct | 2 | 0 UTC | 23.0 N | 85.7 W | 295 deg | 14 mph 24 kph | 105 mph 165 kph | 967 mb | Hurricane - Cat. 2 |
| Oct | 2 | 6 UTC | 23.6 N | 87.2 W | 295 deg | 17 mph 27 kph | 115 mph 185 kph | 962 mb | Major Hurricane - Cat. 3 |
| Oct | 2 | 12 UTC | 24.4 N | 88.3 W | 310 deg | 13 mph 22 kph | 125 mph 205 kph | 952 mb | Major Hurricane - Cat. 3 |
| Oct | 2 | 18 UTC | 25.4 N | 89.5 W | 315 deg | 16 mph 25 kph | 140 mph 220 kph | 941 mb | Major Hurricane - Cat. 4 |
| Oct | 3 | 0 UTC | 26.7 N | 90.3 W | 330 deg | 16 mph 25 kph | 145 mph 230 kph | 940 mb | Major Hurricane - Cat. 4 |
| Oct | 3 | 6 UTC | 28.1 N | 91.4 W | 325 deg | 19 mph 31 kph | 120 mph 195 kph | 957 mb | Major Hurricane - Cat. 3 |
| Oct | 3 | 12 UTC | 29.2 N | 92.1 W | 330 deg | 13 mph 22 kph | 90 mph 150 kph | 962 mb | Hurricane - Cat. 1 |
| Oct | 3 | 18 UTC | 30.5 N | 92.4 W | 350 deg | 14 mph 24 kph | 70 mph 110 kph | 976 mb | Tropical Storm |
| Oct | 4 | 0 UTC | 31.9 N | 92.1 W | 10 deg | 16 mph 25 kph | 45 mph 75 kph | 985 mb | Tropical Storm |
| Oct | 4 | 6 UTC | 33.5 N | 91.4 W | 20 deg | 19 mph 31 kph | 35 mph 55 kph | 994 mb | Tropical Depression |
| Oct | 4 | 12 UTC | 35.8 N | 90.0 W | 25 deg | 28 mph 46 kph | 30 mph 45 kph | 997 mb | Tropical Depression |

Table 3 is an example portion of El Niño data that is collected (in this example, only non-"x" data information is retained in the database).

TABLE 3 xxxxxxxxxxxxxxxYYYYxxxxxxxxxxxIIIxxx

| 03 | 15 | 00 | 00 | 00 | 1902 | −10 | −90 | 0 | 3.0 | 10 |
| 03 | 15 | 00 | 00 | 00 | 1905 | −10 | −90 | 0 | 1.0 | 10 |
| 03 | 15 | 00 | 00 | 00 | 1907 | −10 | −90 | 0 | 2.0 | 10 |
| 03 | 15 | 00 | 00 | 00 | 1914 | −10 | −90 | 0 | 3.0 | 10 |
| 03 | 15 | 00 | 00 | 00 | 1819 | −10 | −90 | 0 | 1.0 | 10 |
| 03 | 15 | 00 | 00 | 00 | 1923 | −10 | −90 | 0 | 2.0 | 10 |
| 03 | 15 | 00 | 00 | 00 | 1931 | −10 | −90 | 0 | 1.0 | 10 |
| 03 | 15 | 00 | 00 | 00 | 1939 | −10 | −90 | 0 | 3.0 | 10 |
| 03 | 15 | 00 | 00 | 00 | 1943 | −10 | −90 | 0 | 3.0 | 10 |
| 03 | 15 | 00 | 00 | 00 | 1951 | −10 | −90 | 0 | 1.0 | 10 |
| 03 | 15 | 00 | 00 | 00 | 1953 | −10 | −90 | 0 | 3.0 | 10 |
| 03 | 15 | 00 | 00 | 00 | 1965 | −10 | −90 | 0 | 3.0 | 10 |
| 03 | 15 | 00 | 00 | 00 | 1976 | −10 | −90 | 0 | 2.0 | 10 |
| 03 | 15 | 00 | 00 | 00 | 1987 | −10 | −90 | 0 | 2.0 | 10 |

Y = year
I = intensity

Another data set, space weather 240 is collected from any one of several international agencies. For example, Table 4 provides a sample portion of available daily geomagnetic data where K indices are calculated at 3 hour intervals and A indices are daily averages.

TABLE 4

| Date | A | K-indices | | | | | | | |
|---|---|---|---|---|---|---|---|---|---|
| | | Middle Latitude Fredericksburg | | | | | | | |
| 2003 09 07 | 3 | 2 | 2 | 0 | 0 | 1 | 1 | 1 | 1 |
| 2003 09 08 | 4 | 0 | 0 | 0 | 1 | 2 | 1 | 1 | 3 |
| 2003 09 09 | 17 | 2 | 2 | 2 | 3 | 4 | 3 | 4 | 4 |
| 2003 09 10 | 12 | 4 | 1 | 2 | 3 | 3 | 2 | 3 | 2 |
| 2003 09 11 | 10 | 3 | 4 | 1 | 2 | 2 | 2 | 2 | 1 |
| 2003 09 12 | 8 | 3 | 3 | 2 | 2 | 2 | 1 | 2 | 1 |
| | | High Latitude College | | | | | | | |
| 2003 09 07 | 2 | 2 | 1 | 0 | 1 | 0 | 1 | 0 | 0 |
| 2003 09 08 | 4 | 0 | 0 | 0 | 0 | 1 | 2 | 1 | 3 |
| 2003 09 09 | 17 | 2 | 2 | 3 | 4 | 4 | 2 | 3 | 4 |
| 2003 09 10 | 30 | 5 | 3 | 3 | 6 | 4 | 4 | 3 | 3 |

TABLE 4-continued

| Date | A | K-indices | | | | | | | |
|---|---|---|---|---|---|---|---|---|---|
| 2003 09 11 | 15 | 3 | 4 | 1 | 4 | 4 | 2 | 1 | 2 |
| 2003 09 12 | 10 | 2 | 3 | 2 | 3 | 3 | 2 | 2 | 1 |
| | | Estimated Planetary | | | | | | | |
| 2003 09 07 | 10 | 3 | 3 | 1 | 2 | 3 | 3 | 3 | 3 |
| 2003 09 08 | 9 | 2 | 1 | 2 | 2 | 3 | 3 | 3 | 3 |
| 2003 09 09 | 19 | 2 | 2 | 3 | 4 | 4 | 3 | 4 | 4 |
| 2003 09 10 | 19 | 4 | 2 | 3 | 4 | 3 | 3 | 4 | 3 |
| 2003 09 11 | 15 | 4 | 5 | 2 | 3 | 3 | 3 | 3 | 3 |
| 2003 09 12 | 11 | 3 | 3 | 3 | 3 | 3 | 3 | 2 | 2 |

Numerous indices are available that reflect conditions in the space environment both near Earth (upper ionosphere) and beyond. Some of the indices that can be collected include sunspot numbers, the A-index which is an indicator of geomagnetic activity, the K-index which is a logarithmic index of geomagnetic activity relative to quiet periods, solar flare occurrences, SSC which is the time of sudden storm commencement or increases in the northward component of the geomagnetic field. Sources that extend beyond the solar system, even though these factors contribute very infrequently to earthquake incidence, are not excluded.

Tidal information (tidal data 250) is calculated or recorded from an almanac source. There are public domain programs that calculate tide phases for any location in the world. Tidal data 250 is an example of data that may be collected and stored, or a program or other process is incorporated to calculate tide data when needed for computations. Other data collected may similarly be provided as data or provided via a program that calculates the data when needed. Each of these data sets is collected and placed into a database or otherwise provided via a program interface that allows any one of the programs to extract information as needed. An alternative would be to create new catalogs of the data in predetermined formats. Each of the diverse datasets are then integrated and incorporated into the earthquake forecasting process.

Figure 3:
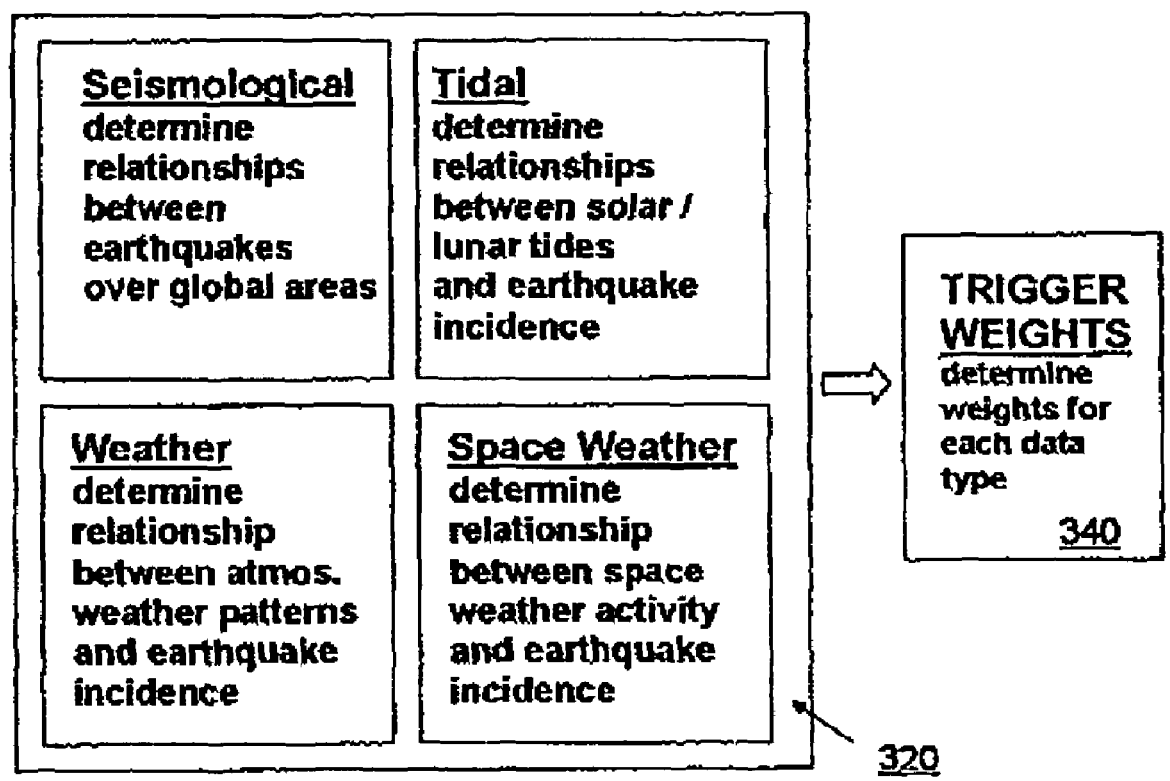
FIG. 3 is a block diagram illustrating ingredients of Correlator programs according to an embodiment of the present invention.
Figure 4B:
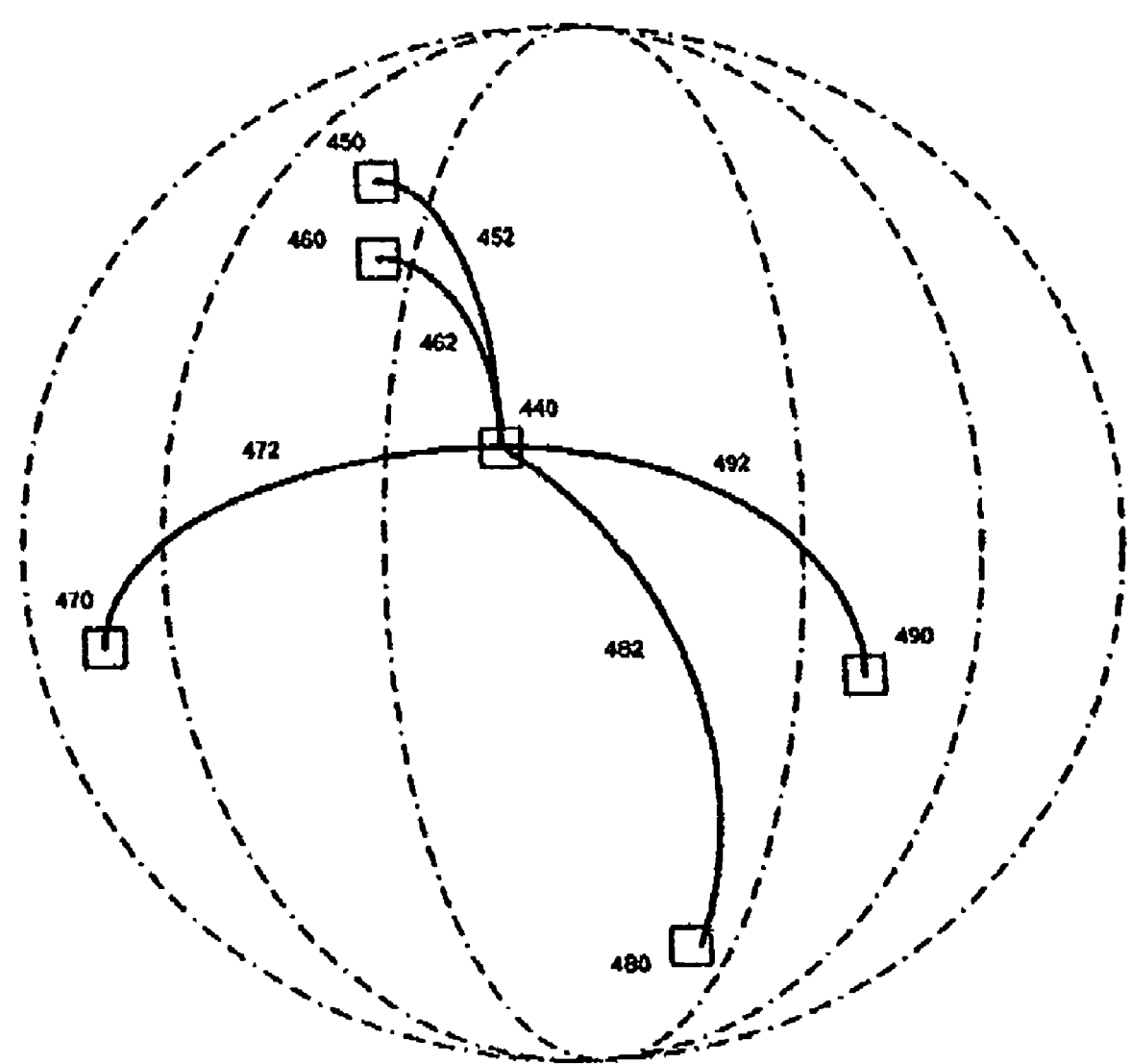
FIG. 4B is a drawing illustrating how multiple events distributed across the globe are used in the calculation of velocities or trigger weights between events/cells.

As shown in FIG. 3, the Correlator programs 120 are used to establish relationships between each of the triggering factors and earthquake occurrences, thereby establishing the patterns that exist between these factors 320 (a process that is also referred to as pattern recognition) (historical earthquakes, weather, space weather, and tidal effects are all incorporated in establishing their correlation to earthquake incidence) and determining trigger weights 340 for each data type. This is done, for example, by breaking up the earth into a grid which the user may define. Although any grid (cell) size may be utilized, the present inventors have found the greatest value in grid sizes ranging from as large as 1 degree cells or as small as 0.1 degree cells. The grid extends across the entire globe. An example grid with a small sample set of relevant cells 450-490 is illustrated in FIG. 4B.

For a specified date, the Correlator programs 120 maps correlations between each of the triggering factors and earthquakes for each cell to determine a relationship between earthquake incidence over the globe with respect to each trigger factor. Since this is a multi-dimensional problem involving a search over time and space, the task is broken down into subsets.

For example, the first search, using a CorrelatorEQ program 400 is described in the flowchart of FIG. 4A and is used to identify the time-distance pattern between earthquakes.

Figure 4C:
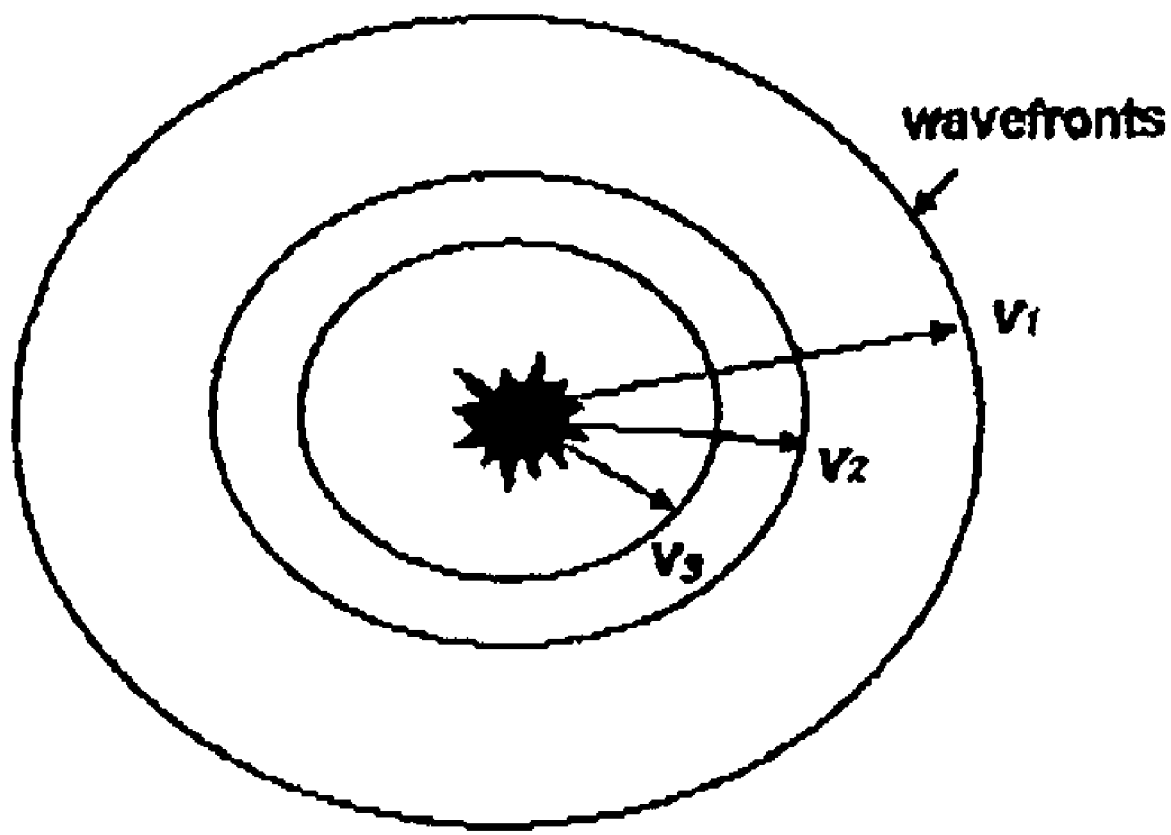
FIG. 4C is a drawing illustrating the series of seismic waves with distinct velocities ($V_1$, $V_2$, $V_3$, etc.) that emanate from an earthquake epicenter.

The time and distance between successive earthquakes can be viewed as a velocity v, where $v=\Delta d/\Delta t$, $\Delta d$ is the great circle distance (arc-distance) interval in degrees and $\Delta t$ is the time interval in days or any other unit of distance. In a physical sense, the "velocity" arises out of the propagation speed of seismic wavefronts. High speed seismic waves, such as P- and S-waves, have been observed to trigger earthquakes at large distances (e.g. the southern California Landers earthquake triggered earthquakes throughout the western United States). Slower waves, also called strain waves, move at velocities several orders of magnitude slower than P- and S-waves. Every earthquake generates a series of these seismic strain waves, just as a pebble generates a train of waves when dropped in a pond (FIG. 4.C). The velocity of these waves depends upon the geology and medium through which these strain waves travel.

If one considers all historical large magnitude earthquakes, for example greater than magnitude 7, and computes the velocity between these large events and successive minor earthquakes in a region, a distribution of velocities emerges with some being more common than others. Some of these more commonly occurring velocities may be observed on a global scale while others prevail on a distinctly local scale. Regional variations are due to differences in geology, tectonics and anything that may alter the speed of propagation of these wavefronts.

Figure 4D:
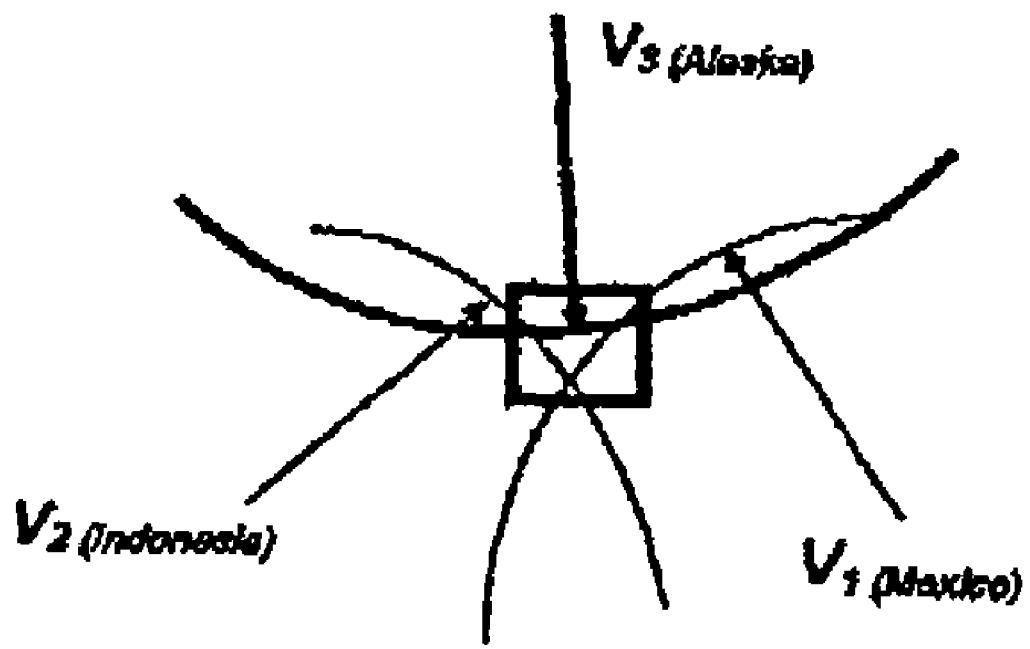
FIG. 4D is a drawing illustrating the intersection of multiple wavefronts on a user specified location.

It is important to note that wavefronts from multiple sources and traveling at different velocities are constantly intersecting one another at points across the globe (FIG. 4D). CorrelatorEQ takes care of mapping these relationships to determine whether or not any (or how many) significant wavefronts are present at any given location and point in time.

Some preferred velocities (given in arc-degrees/day) that are used on regional scales are the following: Alaska includes 0.0138, 0.0172, 0.02, and 0.0235; Mexico includes 0.0138, 0.0145, 0.0171, and 0.0185; the western United States includes 0.0145, 0.0185, 0.0201, and 0.0235. A common velocity on a global scale is 0.0171 degrees/day. Each of these velocities (global and regional) contributes to the makeup of the VELOCITY file. As the location of earthquakes by recording agencies improves with newer three dimensional Earth models, further refinements can be made to the velocities.

When a user invokes CorrelatorEQ, a search is made to look at the arc-distance from any specified earthquake (Choose an earthquake 405) to places on the globe where, for example, major earthquakes above a designated Magnitude (e.g., 6.5 and above) have occurred in the past 40 years (or any user-specified time frame X) 410/420. In the illustrated example the program searches for patterns between historical earthquakes and the earthquake(s) of interest (INPUT). The output file (VELOCITY file) stores all the time-distance relationships as velocities. The user may specify the distance to which earthquakes above the designated magnitude should be included. For example, one might specify that only events out to 90 degrees are to be included. If the user specifies 180 degrees, then all earthquakes from around the globe are included in the search. The time and distance between all earthquake pairs that satisfy the above conditions is sent to (stored in), for example, a velocity file 430. For example, referring again to FIG. 4B, an earthquake in cell 440 (e.g., San Francisco) is plotted against earthquakes in Alaska 450, 460, Sumatra 470, Chile 480, and Colombia 490. The great circle distances for each quake (452, 462 . . . etc., respectively) are calculated and factored with elapsed time between the events to determine the velocity file entry for each event with respect to the San Francisco event. In general, roughly 40% of the earthquakes will correlate with established velocities by the user. Should the user opt to use more velocities, then more earthquakes will be seen to be triggered. The selection of the number of velocities to use is based on experience in working with the data.

Figure 5:
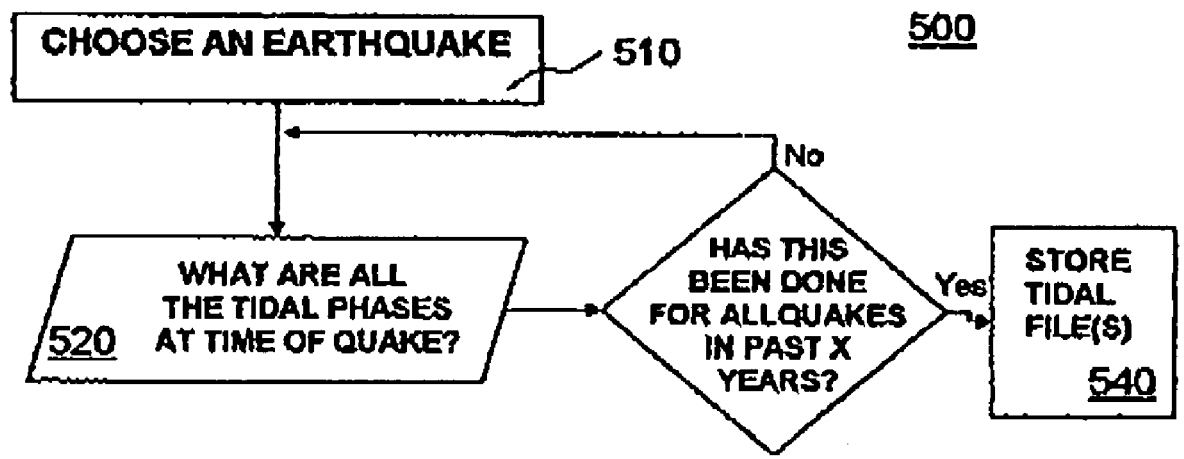
FIG. 5 is a flow diagram of a Tidal correlator program according to an embodiment of the present invention.
Figure 6:
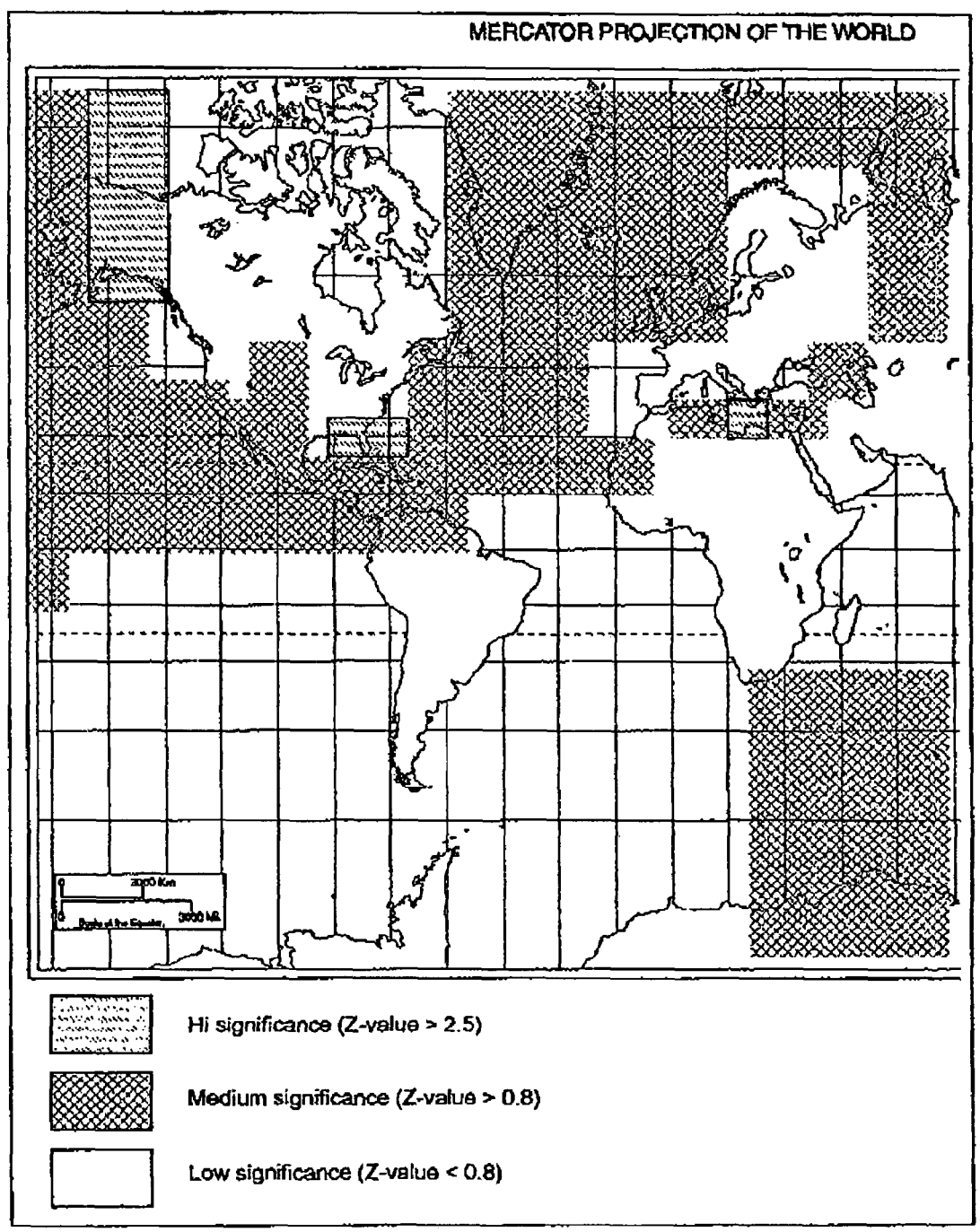
FIG. 6 is an example map indicating the significance of a tidal influence on the rate of earthquake activity according to an embodiment of the present invention.

As shown in FIG. 5, a CorrelatorTIDE program 500 records the location of each earthquake 510 in the past 40 years along with the solar and lunar tidal information at that time 520. The example Tidal correlator program searches for patterns between historical tidal phases and the earthquake(s) of interest (INPUT). The output file (TIDAL file) 540 stores all the tidal relationships. The CorrelatorTIDE output file for the entire globe is graphically represented in FIG. 6. The various shaded areas in FIG. 6 correspond to z-values of statistical significance that tides correlate with earthquake activity at a particular point in the lunar cycle. The z-value is defined as the difference in probability within the sample from the general background probability divided by the standard deviation of the background population.

Figure 7:
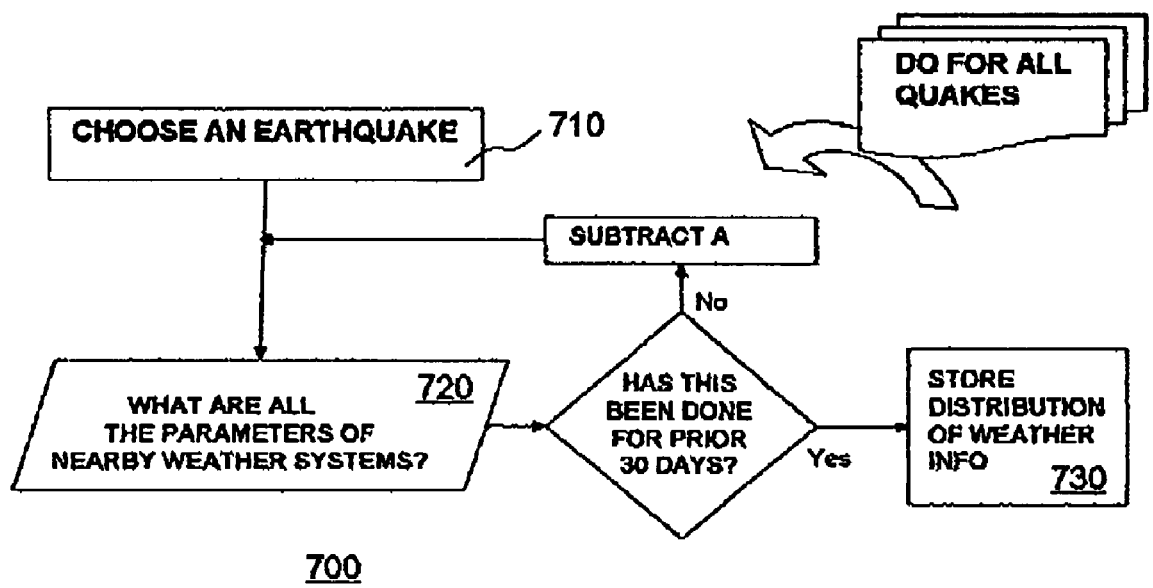
FIG. 7 is a flow diagram of a Weather correlator program according to an embodiment of the present invention.
Figure 8:
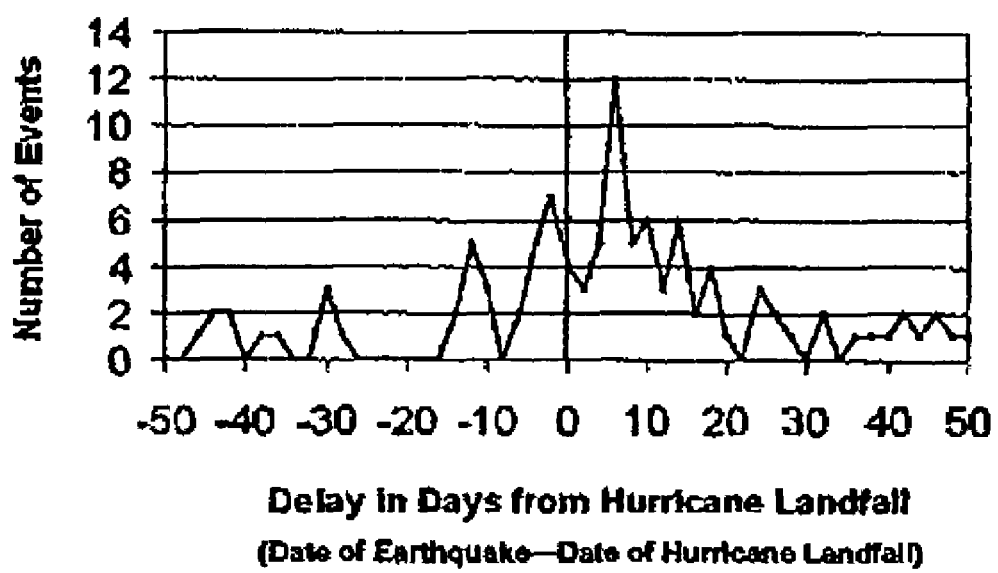
FIG. 8 is a graph illustrating example statistics correlating events to hurricane passage, a data subset according to an embodiment of the present invention.

As shown in FIG. 7, a CorrelatorWEATHER program 700 searches for relationships between earthquake occurrence and weather phenomena. For each earthquake in the catalog 710, a search is conducted 720 for all the significant regional weather patterns over, for example, the prior 30 days (e.g., the weather correlator program searches for patterns between historical weather information and the earthquake(s) of interest (INPUT)). The parameters that are logged include hurricane categories, wind speed, pressure minima, location, wind direction, etc. The accumulated information is stored in a WeatherInfo file 730. The WeatherInfo file 730 is then utilized to compare significant weather events to quakes to determine trigger weights for the weather events. FIG. 8 is an example statistical distribution of regional earthquakes occurring in close proximity to a hurricane weather event.

Figure 9:
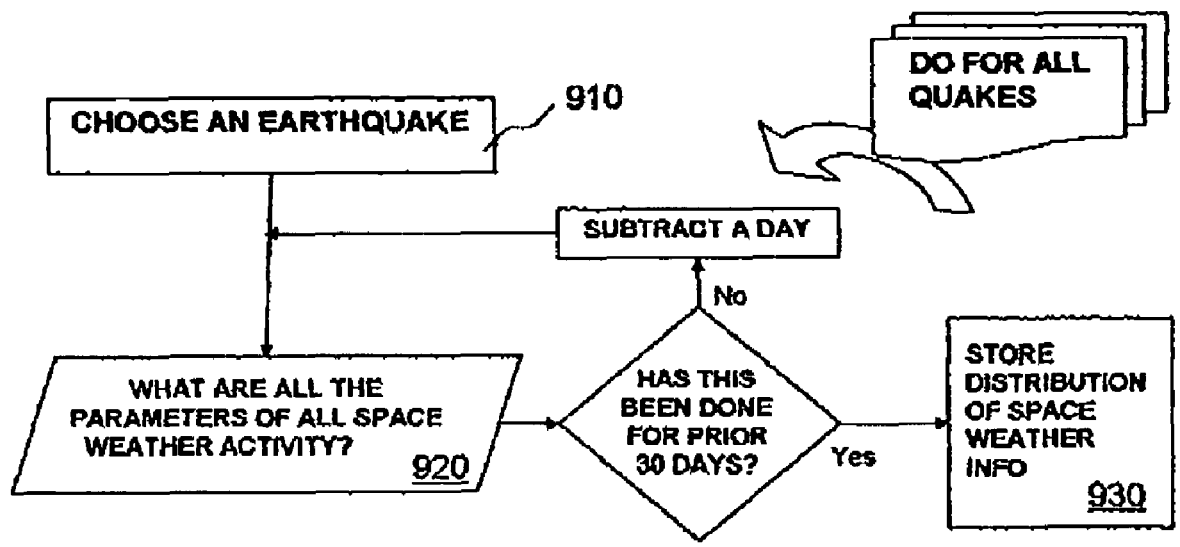
FIG. 9 is a flow diagram of a Space weather correlator program according to an embodiment of the present invention.

As shown in FIG. 9, a CorrelatorSPACE program 900 searches for relationships between earthquake occurrence and space environment phenomena. For each earthquake 910 in the catalog, a search is conducted for all the significant regional spaceweather and space environment patterns 920 over the prior 30 days. The parameters that are logged include solar flares, geomagnetic storm categories, solar wind speed, KP index, AA index, etc. The weather correlator program searches for patterns between historical space weather and the earthquake(s) of interest (INPUT). The accumulated information is stored in a SpaceWeatherInfo file 930. Maps (e.g., similar to that of FIG. 6) and tables of significance and probability are compiled for all regions of the world.

A TriggerWeight program establishes a relative weight between each of the triggering factors and earthquake occurrence. Not all triggers have a maximum influence on the day of earthquake occurrence. In fact, many influence earthquake occurrence several days or weeks or years prior to the occurrence of the earthquake. They may also influence particular locations and not others.

The reasons why a trigger is either immediate or "delayed" in its effect may be determined by analysis of the complex relationships of force, friction, and movements that are applied to the earth's plates and other geologic bodies. While such analysis may be useful and glean additional information to either supplement or validate a forecast, it is not necessary for the statistical analysis of the trigger factors themselves.

Figure 10:
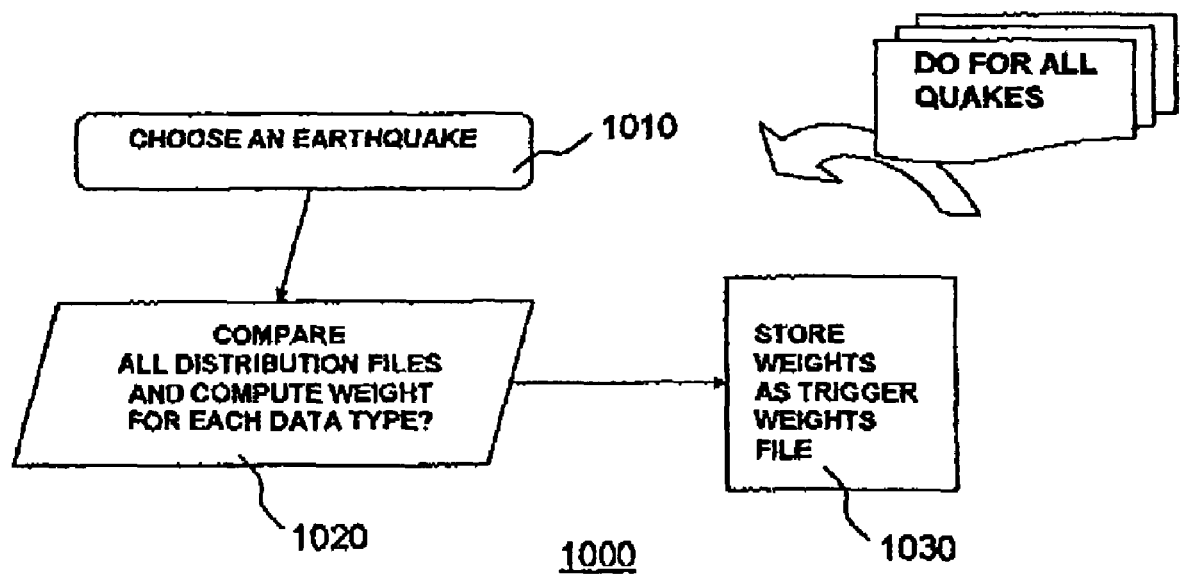
FIG. 10 is a flow diagram illustrating computation of trigger weights according to an embodiment of the present invention.

FIG. 10 is an example program flow 1000 for assigning trigger weights according to an embodiment of the present invention. For each earthquake 1010 on file, a weight is determined. For any specified earthquake, the strength of any given trigger factor is compared against all others, and a corresponding trigger weight is then assigned to each trigger factor. The trigger weights are stored in a trigger weight file 1030. As an alternative to determining formal weights, one might solely log the presence and amplitude of any of the triggers at the time of the earthquake. This log can then be called upon as a pattern recognition tool to implement in the forecasting process. For example, if three different triggers where present at the time of an earthquake, then future simultaneous occurrences of those triggers would imply that another earthquake of similar magnitude might be forthcoming.

These data-driven rules can also be improved upon by adopting neurofuzzy algorithms (e.g., fuzzy logic 415) which can yield significantly more rules to include nearly all of the data parameters. These algorithms incorporate the benefits of both neural networks and fuzzy logic with the following features:

the system is able to dynamically extract knowledge from the data to "learn" and rapidly improve its performance over time;

weights can be readily adjusted continuously;

fuzzy models can explain very complex systems with simple rules;

qualitative (e.g. linguistic) and quantitative information can be combined.

Neurofuzzy algorithms have the ability to calculate all the correlations and assign trigger weights to all the data types simultaneously.

Neurofuzzy algorithms have been widely used by control engineers in designing video cameras, controlling subway systems, flight control, etc. A key feature of neurocontrol is that these systems lend themselves to control systems whose dynamics are highly nonlinear and unknown or uncertain. Other examples can be found of neurofuzzy systems that control wheel wear, obstacle avoidance behavior of mobile robots, image processing, and the control of carbon monoxide levels at traffic intersections in Japan. Only until recently are these algorithms being applied to physical and natural systems.

Figure 11:
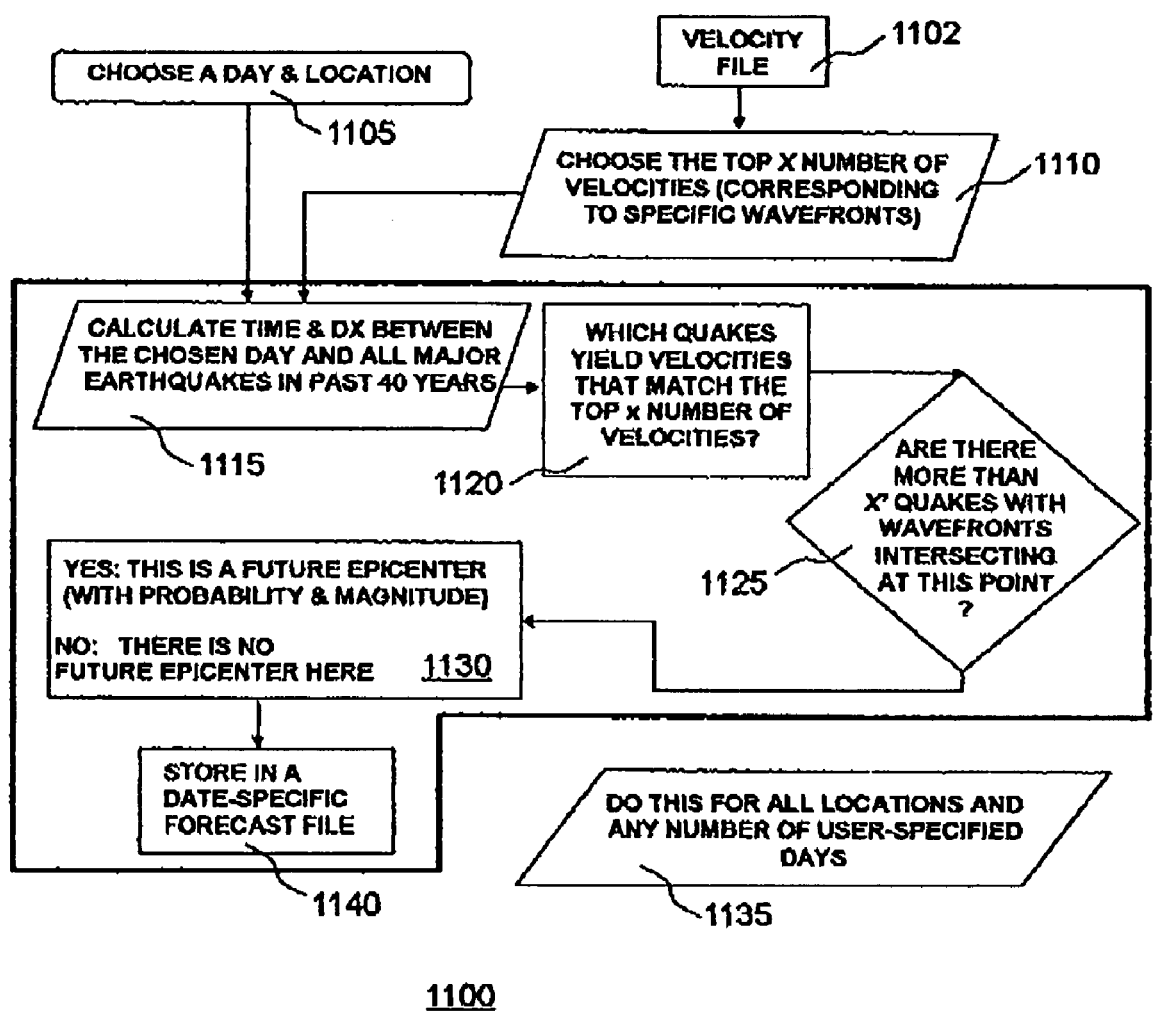
FIG. 11 is a flow diagram of an earthquake forecasting program according to an embodiment of the present invention.

Once the correlations are established, the user is ready to begin the process of forecasting earthquake occurrence. This is done, for example, as illustrated in FIG. 11, by running a ForecastSEISMO program 1100. An initial start date and location is defined by the user 1105. The user also defines how many and which velocities from a velocity file 1102 (e.g., TOP 10) are to be used in the seismology component correlation computations 1115.

Figure 12:
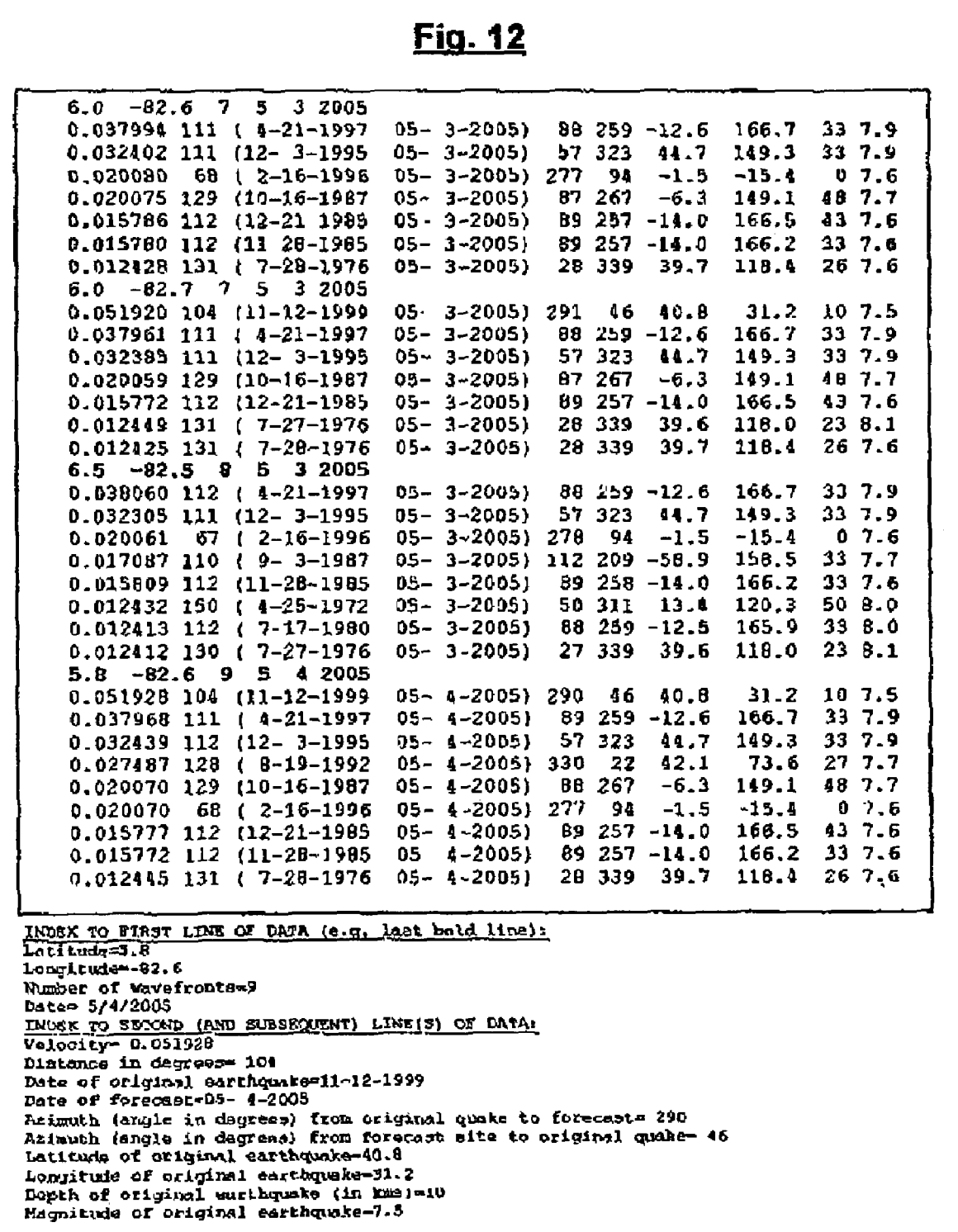

The computer program then calculates the arc-distance and time (e.g. the velocity) between the date and location of interest and the historical earthquakes from around the globe as in FIG. 4.D). If any of these velocities coincides with the most common velocities in the VELOCITY file, then a match is declared and the historical earthquake is logged as a distant trigger (FIG. 12). When 7 or more historical earthquakes are identified, then this location and time are marked as a potential earthquake epicenter (FIG. 4.D and 13).

Since each intersecting wavefront contributes to the triggering of earthquakes, the lower the number of velocities used, the less certain the results. The higher the number of velocities (corresponding to a higher number of wavefronts) used the more confident the results.

A user defined (or automated) input of the date and location for the forecast is utilized. The program reads the VELOCITY input file. The top velocities to consider in the file are, for example, user definable or determined via an automated analysis of the available velocities. The program then computes the potential epicenters and stores the information in the FORECAST file.

From the start date and location 1105, the program calculates the arc-distance and time (e.g. velocity) to the previous large events in the catalog (anywhere in the world or out to some distance away) 1115. If the resulting velocity does not at least meet the user defined velocities 1120 (e.g., or any velocity from some predefined list like a TOP 10 velocity list), then the quake is rejected and the next earthquake is pulled from the catalog for comparison. Once this computation is done for all earthquakes going back a specified number of years, the program then looks to see if enough wave fronts are present at the current location 1125 to declare an "epicenter" 1130. Declaration of an epicenter can be based on a number of factors derived from the velocity file comparisons to the selected day and location. For example, in one embodiment, the present invention declares an epicenter if more than X wavefronts are present at the day and location (e.g., 1125). FIG. 12 shows how seven wavefronts were found near Kyushu, Japan on Mar. 24, 2005 (e.g., see the box with latitude, longitude, number of wavefronts, and the forecast date). This is the beginning of the forecast and identifies the wavefronts (and the earthquakes that generated them) most likely to be affecting a potential earthquake in the region on Mar. 24, 2005. This location is then declared a potential site for an earthquake.

In one embodiment, the velocity selection and computations are repeated for every grid point (in user-defined increments) on the earth to yield a list of potential earthquakes 1135. FIG. 13 is an example listing derived via repeated velocity selection and computations over the entire globe where, for example, events with more than seven (or any number specified by the user) intersecting wavefronts occur simultaneously. To speed up calculations, the program may be configured to only make forecasts in locations where there have been earthquakes in the past (e.g. in zones where earthquakes are to be expected). Further refinements may include configuring the program to only forecast in regions having an earthquake frequency greater than a predetermined frequency threshold.

The results of the global forecasts are stored in a date specific file called FORECAST FILE 1140. The entire forecast computation is repeated for the next day or any other user specified date.

FIG. 12 is an example screenshot illustrating initial data for wavefront velocities according to an embodiment of the present invention. FIG. 13 is an example screenshot illustrating a portion of a forecast file indicating locations having multiple wavefronts according to an embodiment of the present invention.

Figure 14:
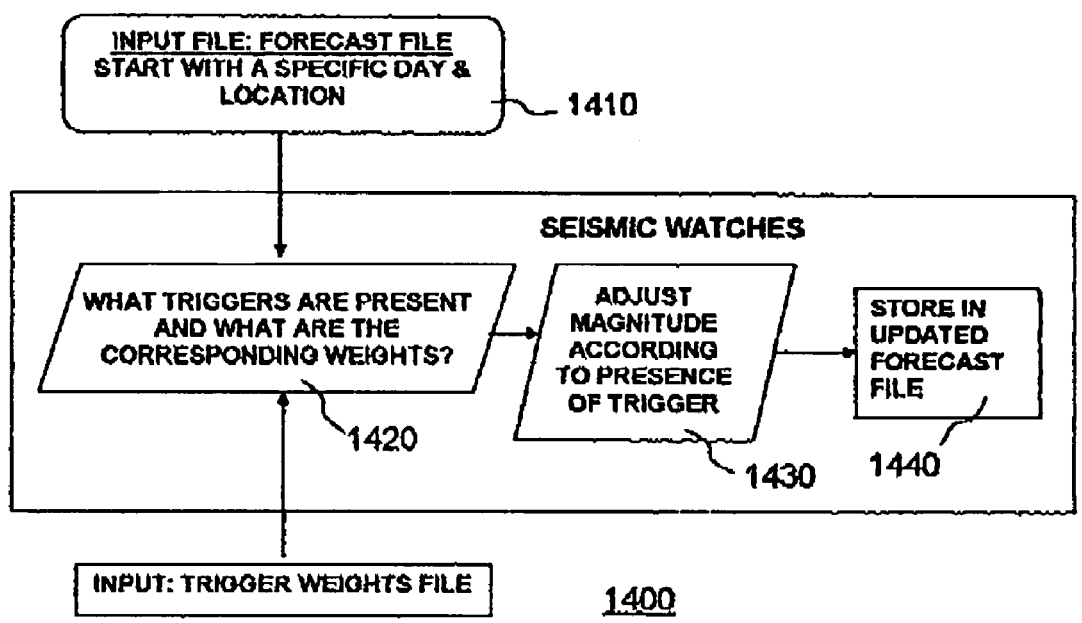
FIG. 14 is a flow diagram of an updated forecasting program according to an embodiment of the present invention.

A second part of the forecast computation adjusts the magnitude and probability of occurrence from the initial computations based on other triggering factors. As shown in FIG. 14, a FORECASTADJUST program 1400 starts with a specific date and location 1410. The program 1400 reads in the previously prepared FORECAST FILE and looks at each location where there is an earthquake forecast and determines any influence that new triggers might have on that location 1420 (e.g., reviewing weights of present trigger factors). For example, the program will look to see if solar/lunar tides might add to the load on that location and contribute to increasing (or decreasing) the magnitude estimate of the forecast earthquake 1430. In addition, the presence or absence of significant trigger factors may be used to increase or decrease the probability. In one embodiment, a heavily weighted trigger factor (>0.75) increases both the probability of occurrence and the predicted magnitude (e.g., by 0.5 magnitude units). The program will then look at all the other triggering factors to determine the appropriate weights that have to be considered as well. Additional trigger factors may either compound or reduce the adjustment. Based on this result the amount of magnitude increase as well as the new probability of occurrence is computed and a final or adjusted forecast is created and stored in forecast file 1440. The program reads in the FORECAST file, the TRIGGER WEIGHTS file, and user specified current trigger information. Magnitude adjustments are then made to the forecast epicenters as Seismic Watches. Final forecasts are placed in the UPDATED FORECAST file. FIG. 15 provides an example update of the forecast file. The forecaster program compares the forecast with the wavefronts available and the current global and regional seismicity, and places a magnitude on the possible event.

Further adjustments to the magnitudes may be performed manually as "seismic watches" are declared. A seismic watch is declared when new triggers are present that have not been considered in the automated processing and represents a time of enhanced seismic activity such as the recognition of any influence on the state of stress in the Earth. The new triggers are, for example, recent events included in the data from which the original forecast was derived. The new trigger may also be from a class of triggers not considered by the program. For example, volcanic activity, animal behavior patterns, etc. In one embodiment, new triggers are selectively applied to either the probability of occurrences and/or to the predicted magnitude. Preferably, seismic watches are an exclusive influence to change in forecasts made with significant lead time (e.g., 1 year in advance).

FIGS. 16 A and 16B illustrate an example of graphical user interfaces utilized according to an embodiment of the present invention for the creation/editing 1600 and display/confirmation 1650 of a seismic watch. A user identifies a geographic range (e.g., min/max lat and long) 1610, start/end dates 1620, and a magnitude modifier 1630. The system assigns an ID, date stamp, and status indications. In this example, multiple watches have been created (swid's 2534 and 2535). As illustrated, the UPDATED FORECAST file can also be manually updated at any time with adjustments made to the magnitudes over broad geographic areas and user-specified time frames as conditions warrant.

In FIG. 16B, the GUI 1650 confirms a seismic watch prior to activation. The relevant information is location (geographic area 1660), Description 1670, Magnitude Delta 1680, ID, and Creation Information (e.g., date/time 1685). In the example of FIGS. 16A and 16B, a global seismic watch (SWID #2549) was created and a magnitude adjustment was made for the period indicated.

The forecasts outputs consist of tables of individual earthquake events (e.g. epicenters) for specific dates, locations, magnitude estimates (in the form of magnitude ranges), and the probabilities of occurrence (e.g., see FIGS. 13 and 15). From these tables, maps may be created in graphical displays of various formats. These maps show, for example, the locations of earthquake epicenters, and/or they may indicate regions of varying degrees of probability of earthquake occurrence. The graphical user display also allows the user to plot actual versus forecast earthquakes for different time periods, which are useful in evaluating the quality of the forecasts. Forecasts may be color-coded to show degrees of reliability and further indicate the quality of the forecast.

Figure 17:
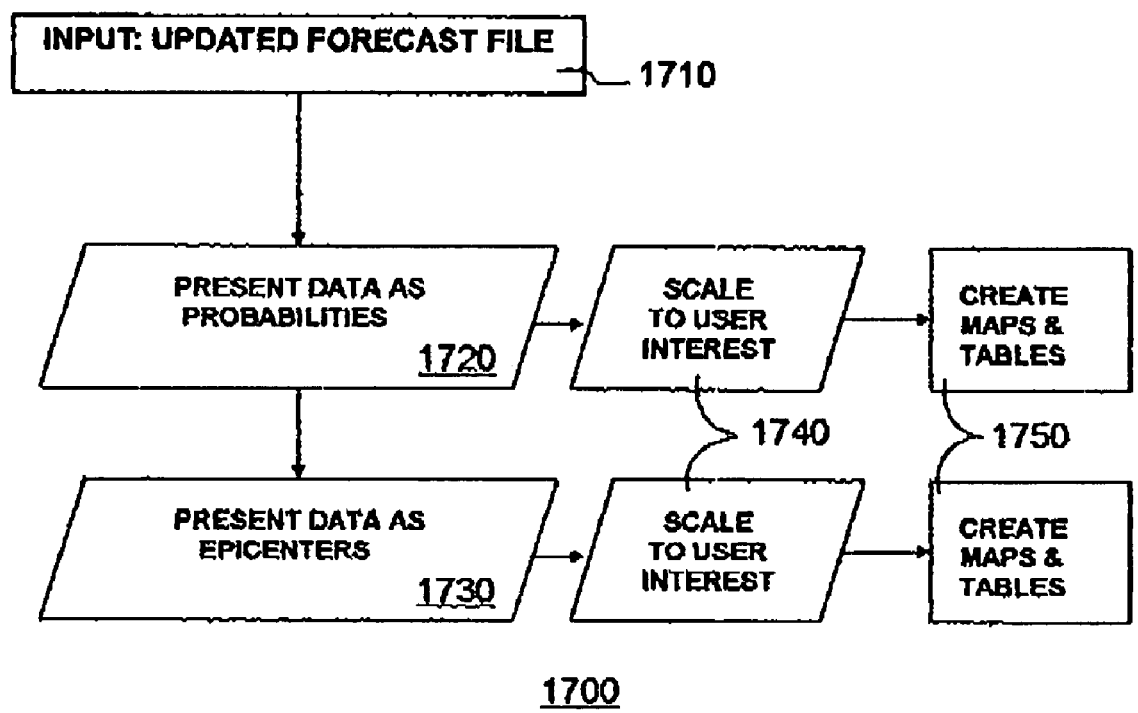
FIG. 17 is a flowchart of data output and manipulation programs according to an embodiment of the present invention.

As shown in FIG. 17, an UPDATED FORECAST file 1710 is manipulated to show epicenters in either a tabular form or as a map. The manipulation may include, for example, presentation of the data as probabilities 1720 or epicenters 1730. The data is scaled 1740 to the user's interest and then displayed as tables or maps 1750 of seismic activity.

Figure 18:
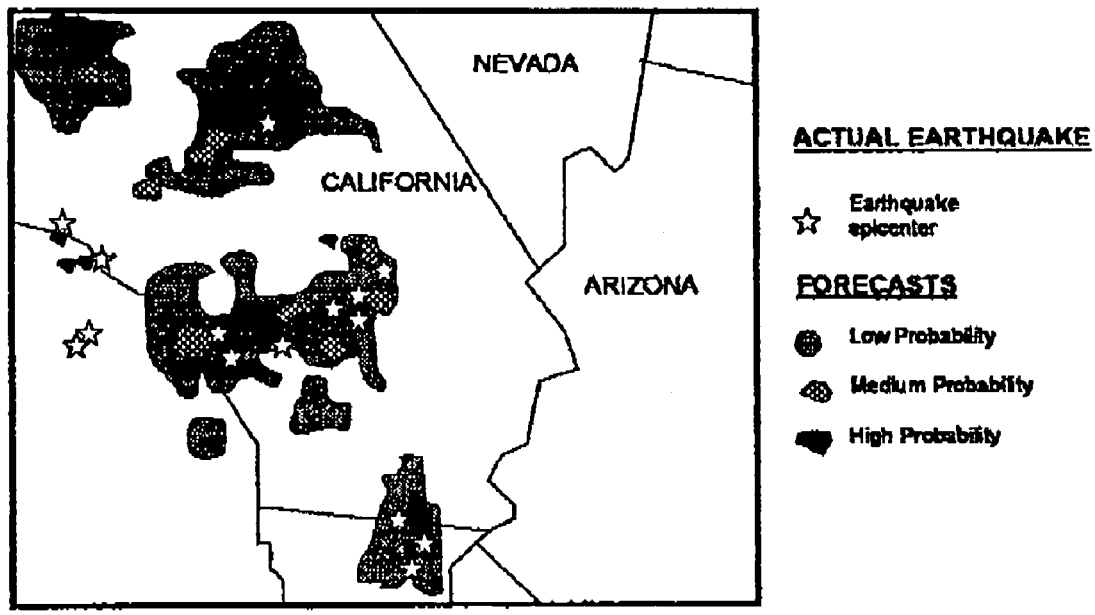
FIG. 18 is an example comparison between actual and forecast earthquakes according to an embodiment of the present invention.

The quality of the forecast reflects the errors in the earthquake parameters (magnitude, time, location) between the forecast and actual events. As shown in FIG. 18, a comparison between the forecast probabilities (e.g., which can be shown as regional pattern variations or color coded dots) with the location of actual earthquakes (e.g., stars) is displayed. The probabilities are coded, for example, from little to high probability for all events greater than or equal to magnitude 2 occurring sometime during the week of Mar. 18-22, 2002. Actual earthquakes (stars) generally occurred within the forecast areas. The error sizes are arbitrary but the parameters have been chosen to reflect differences in the actual earthquake locations by different reporting agencies, the dimensions of fault rupture for different magnitude earthquakes, and general experience in forecast accuracy.

Figure 19:
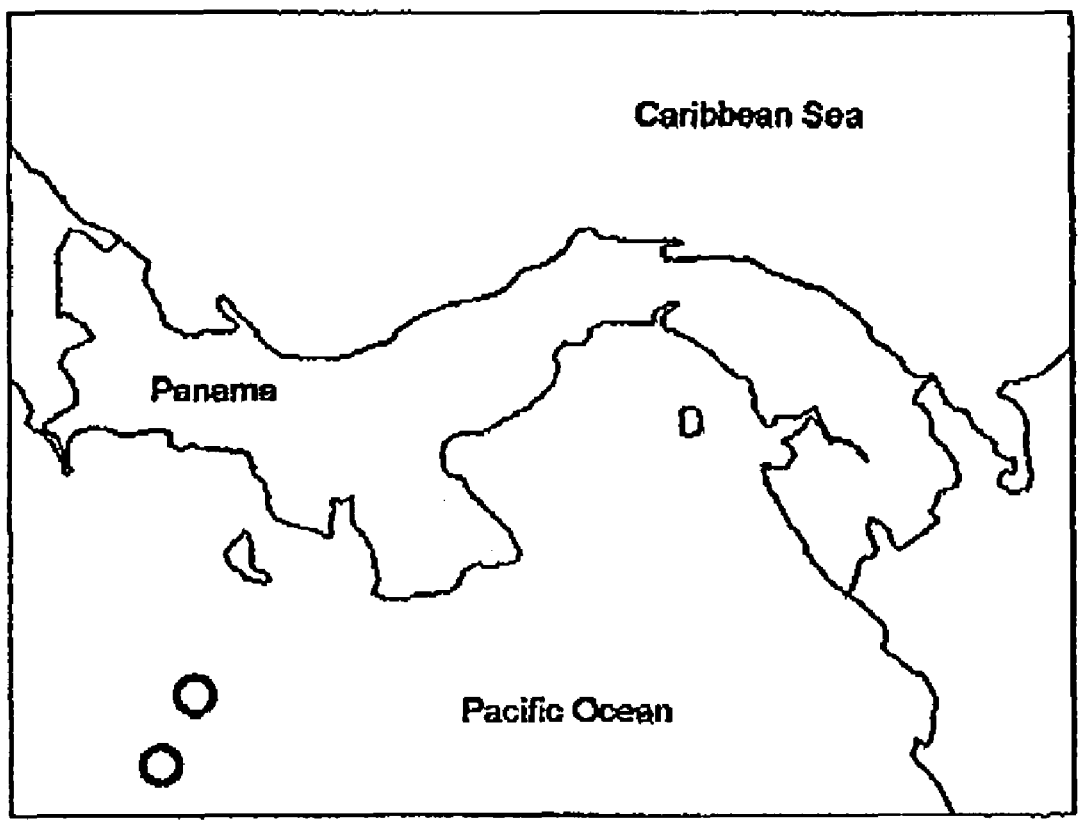
FIG. 19 is a screenshot of forecast earthquake activity for Panama, produced according to an embodiment of the present invention.
Figure 20:
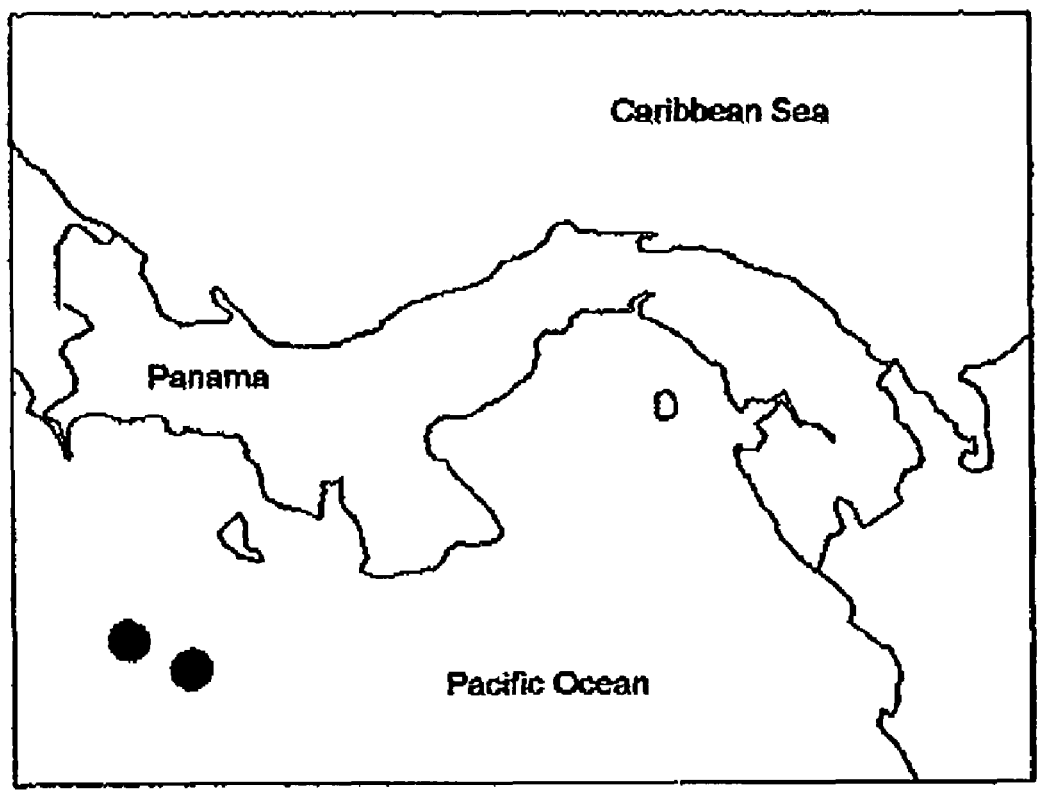
FIG. 20 is a screenshot according to an embodiment of the present invention of actual earthquake activity.

FIGS. 19 and 20 show how close the forecast and actual occurrence of a strong earthquake off the Panamanian Coast was in early May, 2005.

A global quiet period which lasted from April 11 through May 4 during which no earthquakes of M>6 were located in the world outside the Sumatra aftershock zone ended with this M 6.3 earthquake followed by a strong M 5.7 aftershock in the ocean off southern Panama as shown in FIG. 20. This earthquake, while large, was not reported felt as the area is remote from human settlement. However, this is the strongest earthquake in the large region off the southern coast of Central America (0-8N 79-86W) in nearly three years.

The epicenter of these two earthquakes occurred within 10-20 km latitude and longitude of forecast 23721 which expected activity in this area around May 3-4, 2005 with maximum magnitude up to M 5.5, as illustrated in FIG. 19.

This forecast was first published on Geoforecaster's website (http://www.geoforecaster.com) on Apr. 23, 2005.

A seismic watch was also published on a public web site on April 29, effective through May 6, and had stated "Most likely areas to see an event of M>6 are within 20 degrees of the equator . . . . Expected probability of an event of M>6 during the period is 65%." The seismic watch boosted the original forecast magnitude to give an excellent forecast.

The present invention includes the provision of a standard set of files for earthquake processing that are accessible to individual forecasters, on their own private account, via the Internet or other network. The standard files include an earthquake catalog of all know scientifically recorded earthquake events to at least a minimum magnitude. Optionally, non-scientifically recorded events may be included in the catalog if a reasonable scientific basis is available to support their inclusion. The earthquake catalog is utilized by the individual forecasters to set up velocity files in the preparation of the individual's own forecast (e.g., each forecaster/user is able to specify their own threshold magnitudes, number of years prior, and grid cell sizes to individually customize the data upon which their forecasts will be based).

Other files available to individual forecasters include tidal information, space weather, etc. A user interface receives inputs related to the time and magnitudes of correlated and forecasted data points (e.g., X, 1110; number of years 1115, etc.). Results are displayed or placed in a file (e.g., emailed to the user).

Once forecasts are generated, they may be used on an "as is" basis for emergency management, news media, insurance, risk management decision-making, or for any other general use. However, the usefulness of the forecasts becomes enhanced when it is used in conjunction with other non-geophysical data to forecast outcomes in new markets.

The earthquake forecasts may be treated as a stand-alone dataset to be correlated and used to forecast financial markets. Earthquake occurrence can be directly tied to energy markets since major earthquakes may result in the loss of energy producing facilities. This in turn may lead to loss of economic revenues and affect local, regional, or national GDP.

One way to hedge against the loss of energy revenue is through earthquake derivatives. Earthquake Derivatives is a new concept that is similar in principal to weather derivatives. Earthquake forecasts can be tied to future pricing of energy (oil or gas), certain manufacturing sectors (such as high tech), and tourism. The Chi-chi earthquake in 1999 adversely affected the hi-tech chip manufacturers in Taiwan and led to substantial delays in the supply of chips to firms in the United States.

Figure 21:
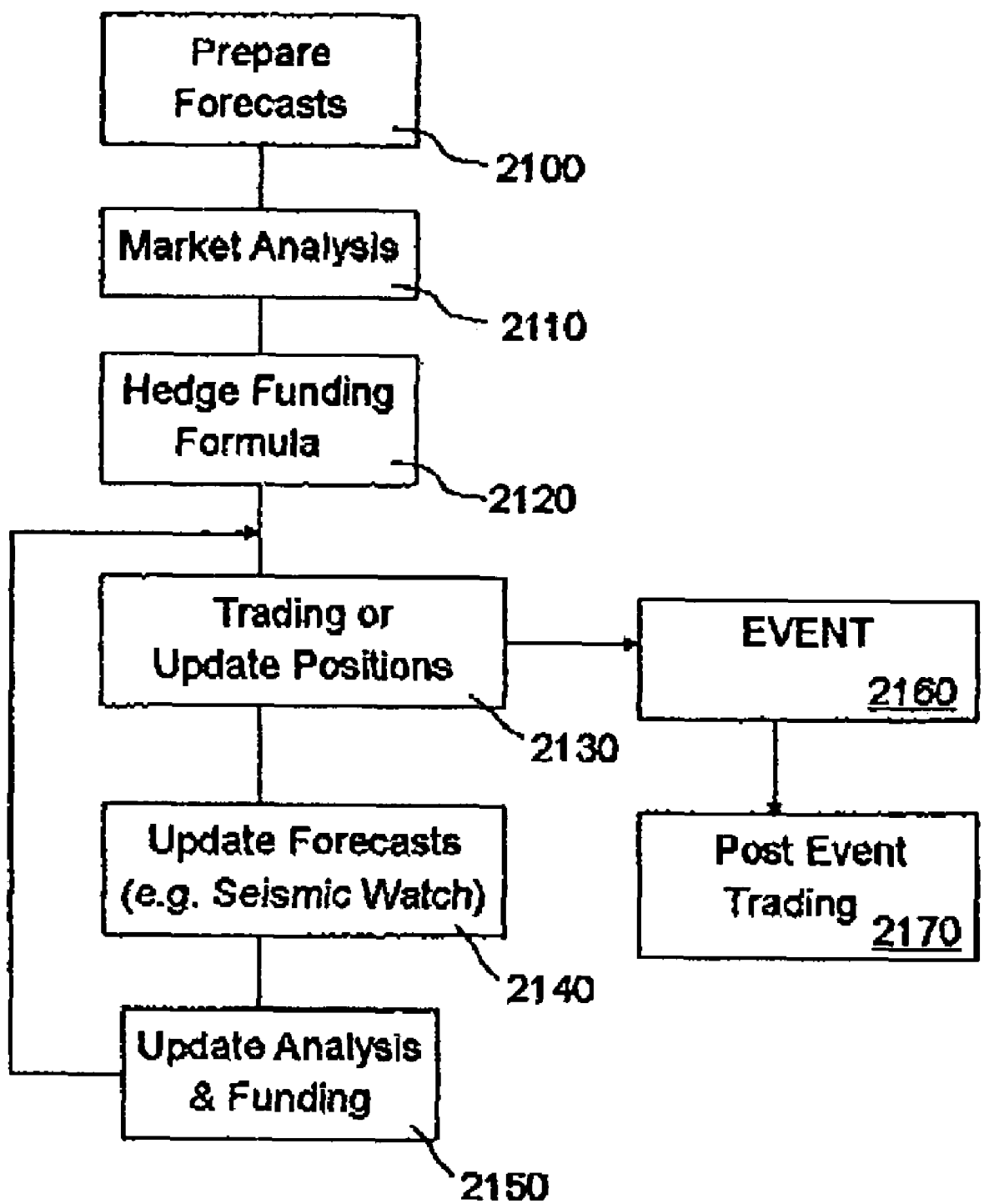
FIG. 21 is a flowchart illustrating how earthquake forecasts may be treated as a stand-alone dataset to be correlated and used to forecast financial markets according to an embodiment of the present invention.

In one embodiment, earthquake forecasts 2100 are utilized in program trading. As shown in FIG. 21, the forecasts are integrated into a market analysis 2110 that is then utilized to place positions 2120/2130. The forecasts are updated 2140 along with the positions. The positions are speculative in reliance of the forecast. When the event occurs, a separate post-trading program 2170 is implemented to take advantage of recovery effects in the markets.

In another embodiment, the correlations such as those described in FIGS. 1 and 2 can be reconfigured for the process of correlating financial markets with earthquake occurrence can be performed. The correlations can then be used with the earthquake forecasts to give energy traders an indication of what the short coming in energy production might be at any given time.

The invention is not limited to these applications. Any application from which a forecast, or particularly an earthquake forecast, might provide insight into planning, preparation, or other issues is an applicable application.

Figure 22:
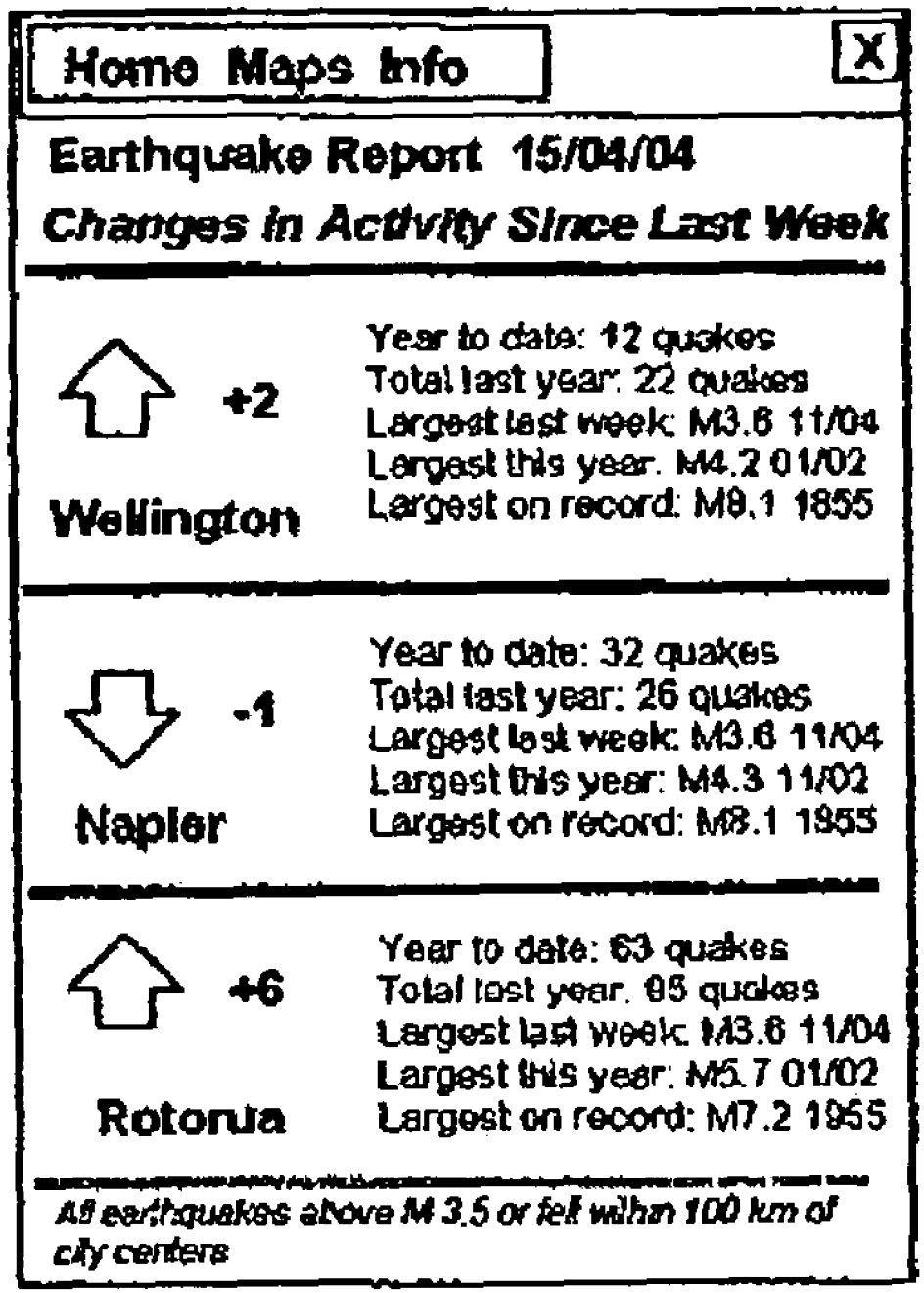
FIG. 22 is a screen show of press release style information byte according to an embodiment of the present invention.

FIG. 22 is a screen show of press release style information byte according to an embodiment of the present invention. The press release style information is formatted for inclusion in a receiving entity's newspaper, or for transmission and display on any of a receiving entity's web page, PDA, or cell phone display. The press release style information includes, for example, predictions and/or activity updates for a location of the receiving entity. In one embodiment, a forecasting server receives GPS location data from a user's cell phone and transmits earthquake data to the user's cell phone for the location data.

Although the present invention has been described herein with reference to earthquake prediction, the data collections, analysis, and processes of the present invention may be applied to other events or occurrences, including, but not limited to, actuarial accounts (e.g., homeowner insurance policy risk forecasts based on neighborhood factors), stock and fund forecasting based on economic data, etc. Further, forecast data itself may then be applied to markets or other forecasts that might be affected by the forecasted event. For example, a homeowner insurance policy risk forecast would utilize a variety of diverse datasets including, for example, a dataset related to the risk of an earthquake, the risk of fire, the risk of personal injury suits, the risk of vandalism, etc. The risks themselves (e.g., earthquake, fire, etc.) being, for example, individual forecasts. Thus, the earthquake forecast may also be utilized in other forecast programs, such as insurance, stock forecasting (certain stocks typically benefiting from earthquakes and others losing, at least temporarily), futures markets, etc.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a velocity file which comprises a time distance relationship between a location and an event (or between two events), any other equivalent device or mechanism that describes any quantifiable relationship between the events and/or location-event may be utilized. Further, any device or mechanism having an equivalent function or capability compared to those described, whether or not listed herein, may be substituted therewith. Furthermore, the inventors recognize that newly developed technologies not now known may also be substituted for the described parts and still not depart from the scope of the present invention. Therefore, all described items, including, but not limited to data sets/collection, user interfaces, data set management, parameters, trigger factors, relationship analysis, weighting, etc. should also be consider in light of any and all available equivalents.

The present invention is generally intended to be implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. Certain portions of the invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CDRW+/−, micro-drive, and magneto-optical disks, ROMs, RAMs, EPROMs, EEPROMs, DRAMs, VRAMs, flash memory devices (including flash cards, memory sticks), magnetic or optical cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, collecting earthquake data, correlating earthquake data, establishing triggers and weights, forecasting events based on correlated data, triggers, and weights, and applying forecasted events to emergency management, financial, energy, commodity, and other markets, and the display, storage, or communication of results according to the processes of the present invention.

The present invention may suitably comprise, consist of, or consist essentially of, any of element (the various parts or features of the invention, and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed is:

1. A computational system that provides an earthquake forecasting service, comprising:
   a database of a diverse range of data files including data related to past earthquakes;
   an earthquake forecasting module configured to compute a probability and magnitude of an earthquake occurring at the location of interest based on the diverse range of data files; and
   a report generator configured to provide reports in the form of maps or tables that show the time and/or location of probable earthquakes;
   wherein the diverse range of data files includes data from electromagnetic conditions emanating from non-terrestrial sources.

2. The system according to claim 1, further comprising:
   an input device configured to retrieve a user specified time and location of interest;
   wherein the reports comprise a probability of an earthquake at the location of interest.

3. The system according to claim 1, wherein the diverse range of data files comprise user provided files.

4. The system according to claim 1, wherein the diverse range of data files comprise internal system files generated from an automated process where the data is pulled from different sources and reformatted and entered into the database.

5. The system according to claim 1, wherein the report generator comprises a graphical display configured to allow the user to highlight individual earthquake events and probabilities of events.

6. The system according to claim 1, further comprising a rating system configured to assist a user in identification of individual forecasts and score them against actual events.

7. The system according to claim 1, further comprising:
   a web based user interface configured,
   to allow user login and collection of information from the user at a remote location, and
   to display reports created based on information collected from the user.

8. The system according to claim 1, further comprising an automated data update mechanism configured to receive new data regarding recent earthquakes and automatically update the database.

9. The system according to claim 8, further comprising an alert notification device configured to notify individual users of the system of any newly forecasted earthquakes in an area of interest specified by the individual users.

10. The computational system according to claim 1, wherein the earthquake forecasting model compare a series of velocity calculations between earthquake events and a point of interest of the report.

11. The computational system according to claim 1, wherein the data from electromagnetic conditions comprises a level of disturbance in the earth's geomagnetic field due to solar flare activity.

12. The computational system according to claim 1, wherein the diverse range of data files further includes data related to lunar and solar tidal phase data, hurricane trajectory data, geomagnetic KP and AA data, and solar flare data.

13. A method, of building a statistical base for earthquake forecasting, comprising the steps of:
   collecting data from diverse data sources, including data related to geomagnetic disturbances caused by solar activity;
   correlating the collected data relative to each earthquake in a database of previous earthquakes;
   forecasting future earthquake events based on the correlated data; and
   displaying the forecasted earthquake events.

14. The method according to claim 13, wherein the diverse data sources comprise at least two of an earthquake data source, a tidal data source, and a weather data source.

15. The method according to claim 13, wherein the diverse data sources comprise an earthquake data source, an oceanic information data source, a space environment data source and an atmospheric weather data source; and
   the oceanic information data source comprises at least one of tidal information.

16. The method according to claim 15, wherein data in each diverse data source is derived from multiple original data sources.

17. The method according to claim 13, wherein the diverse data sources comprise an earthquake data source.

18. The method according to claim 17, wherein data in the earthquake data source is derived from multiple data sources.

19. The method according to claim 18, wherein the multiple data sources are merged by removing redundant data from less preferred sources.

20. The method according to claim 17, wherein the weather data source comprises hurricane data.

21. The method according to claim 13, wherein the diverse data sources are derived from multiple original sources contain data having at least some duplicative information types.

22. The method according to claim 21, further comprising the step of refining the collected data by removing duplicate data entries from the collected data prior to correlating.

23. The method according to claim 22, wherein said step of removing comprises removing based on a hierarchy.

24. The method according to claim 23, wherein the hierarchy gives precedence to data sources local to the event for which data is being collected.

25. The method according to claim 23, wherein the hierarchy gives precedence to national data sources when other available sources are not local to an event for which data is being removed.

26. The method according to claim 13, wherein said step of correlating comprises the step of compiling data that correlates each earthquake against each of weather events at or near the time of the earthquake, tidal information at or near the time of the earthquake, and other earthquakes.

27. The method according to claim 26, wherein:
the step of compiling data comprises determining velocities for an earthquake with respect to all other earthquakes, wherein the velocities comprise a time-distance relationship between quakes; and
the step of forecasting comprises comparing velocities of past earthquakes to velocities of a future epicenter.

28. The method according to claim 26, wherein:
the step of compiling data comprises determining strain velocities and azimuths for an earthquake with respect to all other earthquakes, wherein the velocities comprise a time-distance relationship between quakes; and
the step of forecasting comprises identifying the number of intersecting strain waves with a set of preferred velocities from recent or historic earthquakes at a user defined point in space and time.

29. The method according to claim 13, wherein:
at least some of the correlated data comprises trigger factors; and
the method further comprises the step of adjusting at least one of probability and magnitude of forecasted earthquake events based on the correlated trigger factors.

30. The method according to claim 13, further comprising the steps of calculating a series of velocities between major events of the collected data.

31. The method according to claim 13, wherein the step of forecasting comprises calculating a set of velocities between an evaluation point and events of the collected data and basing the forecast on the set of velocities.

32. The method according to claim 13, wherein the diverse range of data files further includes data related to lunar and solar tidal phase data, hurricane trajectory data, geomagnetic KP and AA data, and solar flare data.

33. The method according to claim 13, wherein the display comprises at least one of a tabular listing, printout, map, web page, PDA, or cell phone.

34. A forecasting method, comprising the steps of:
calculating first velocity relationships between each major event and every other major event in a database of events;
choosing an evaluation point;
calculating second time/distance velocity relationships between the evaluation point and all major events in the catalog for a predetermined previous time frame;
forecasting an event at the evaluation point if more than a predetermined number of the second velocities exceed a threshold velocity, and
displaying the forecasted event.

35. The method according to claim 34, wherein the threshold velocity is an nth highest of the first velocities.

36. The method according to claim 34, wherein the events are earthquakes.

37. The method according to claim 34, wherein the events are commodity pricing movements.

38. The method according to claim 34, further comprising the step of implementing a financial trading program based on the forecast.

39. The method according to claim 34, further comprising the step of forecasting a magnitude of the event based on at least one of the first and second velocities.

40. The method according to claim 39, further comprising the step of adjusting the magnitude based on trigger factors.

41. The method according to claim 34, wherein the steps of the method are embodied in computer readable instructions and stored on a computer readable media, that, when loaded into a computer, cause the computer to perform the steps of the method.

42. A method, of building a statistical base for earthquake forecasting, comprising the steps of:
collecting data from diverse data sources;
correlating the collected data relative to each earthquake in a database of previous earthquakes;
forecasting future earthquake events based on the correlated data; and
displaying the forecasted future earthquake events;
wherein:
the diverse data sources comprise an earthquake data source, an oceanic information data source, a space environment data source and an atmospheric weather data source; and
the oceanic information data source comprises at least one of tidal information.

43. A method, of building a statistical base for earthquake forecasting, comprising the steps of:
collecting data from diverse data sources;
correlating the collected data relative to each earthquake in a database of previous earthquakes;
forecasting a future earthquake event based on the correlated data; and
preparing a report that indicates a time and/or location of the forecasted earthquake event,
wherein:
the diverse data sources comprise an earthquake data source
data in the earthquake data source is derived from multiple data sources; and
the multiple data sources are merged by removing redundant data from less preferred sources.

* * * * *